US012632229B2

(12) United States Patent
Wille et al.

(10) Patent No.: US 12,632,229 B2
(45) Date of Patent: May 19, 2026

(54) CREATION AND AUTOMATIC UPDATING OF A SOFTWARE APPLICATION

(71) Applicant: Novulo R&D B.V., Enschede (NL)

(72) Inventors: Frank Wille, Enschede (NL); Wim Minnen, Enschede (NL); Erik-Jan Krijgsman, Enschede (NL)

(73) Assignee: NOVULO R&D B.V., Enschede (NL)

( * ) Notice: Subject to any disclaimer, the term of this patent is extended or adjusted under 35 U.S.C. 154(b) by 268 days.

(21) Appl. No.: 18/552,822

(22) PCT Filed: Mar. 25, 2022

(86) PCT No.: PCT/NL2022/050167
§ 371 (c)(1),
(2) Date: Sep. 27, 2023

(87) PCT Pub. No.: WO2022/211619
PCT Pub. Date: Oct. 6, 2022

(65) Prior Publication Data
US 2024/0168727 A1      May 23, 2024

(30) Foreign Application Priority Data
Mar. 29, 2021    (NL) ...................................... 2027852

(51) Int. Cl.
*G06F 8/35*                (2018.01)
*G06F 8/41*                (2018.01)
(Continued)

(52) U.S. Cl.
CPC .................. *G06F 8/35* (2013.01); *G06F 8/41* (2013.01); *G06F 8/65* (2013.01); *G06F 8/71* (2013.01)

(58) Field of Classification Search
CPC ..... G06F 8/35; G06F 8/41; G06F 8/65; G06F 8/71; G06F 8/30; G06F 8/60; G06F 8/70
(Continued)

(56) References Cited

U.S. PATENT DOCUMENTS 7,062,753 B1    6/2006  Ward et al.
7,536,679 B1    5/2009  O'Connell et al.
(Continued)

FOREIGN PATENT DOCUMENTS

WO          2022211618  A1    10/2022

OTHER PUBLICATIONS

"Apex Developer Guide", Sep. 3, 2020, 3615 pages, Retrieved from https://resources.docs.salesforce.com/226/latesVen-us/sfdc/pdf/salesforce_apex_language_reference.pdf.
(Continued)

*Primary Examiner* — Thuy Dao
*Assistant Examiner* — Zengpu Wei
(74) *Attorney, Agent, or Firm* — Steven M. Koehler; Westman, Champlin & Kochler, P.A.

(57)          ABSTRACT

A system for creating and/or updating a software application, based on a plurality of software components specified in an application specification, and associated with a database, is configured to: select a data element referred to by a software component, the data element being stored in a catalogue and associated with a unique identifier, the data element not being implemented by the software component; search, based on the identifier, for a further software component in the subset which implements the data element; determine a database element associated with the data element identifiable by the identifier; generate software for the software application from the application specification, the generation comprising linking, based on the identifier, the reference to the data element in the software component
(Continued)

to the implementation of the data element by the further software component; and generate database commands to create the database based on at least the determined database elements.

20 Claims, 6 Drawing Sheets

(51) Int. Cl.
    *G06F 8/65*              (2018.01)
    *G06F 8/71*              (2018.01)

(58) Field of Classification Search
    USPC ........................................................ 717/104
    See application file for complete search history.

(56)                References Cited

U.S. PATENT DOCUMENTS

| | | | |
|---|---|---|---|
| 8,239,855 B2 | 8/2012 | Wetherell et al. | |
| 8,584,086 B2* | 11/2013 | Yoshimura | G06F 8/36 |
| | | | 717/121 |
| 9,727,623 B1* | 8/2017 | Catania | G06F 16/2379 |
| 10,613,970 B1* | 4/2020 | Jammula | G06F 11/3688 |
| 2004/0254951 A1* | 12/2004 | Bloesch | G06Q 10/00 |
| | | | 707/999.102 |
| 2008/0115116 A1 | 5/2008 | Francis et al. | |
| 2013/0263090 A1 | 10/2013 | Polk et al. | |
| 2014/0109082 A1* | 4/2014 | Kimmet | G06F 11/3051 |
| | | | 717/176 |
| 2015/0169302 A1* | 6/2015 | DeAnna | G06F 8/30 |
| | | | 717/140 |
| 2016/0098256 A1* | 4/2016 | Tehrani | G06F 8/10 |
| | | | 717/107 |
| 2016/0321064 A1* | 11/2016 | Sankaranarasimhan | |
| | | | H04L 67/34 |
| 2018/0203674 A1* | 7/2018 | Dayanandan | G06F 8/35 |
| 2018/0293085 A1* | 10/2018 | Li | G06F 8/41 |
| 2019/0042233 A1 | 2/2019 | Majumdar et al. | |
| 2020/0183683 A1 | 6/2020 | Majumdar et al. | |
| 2021/0089436 A1 | 3/2021 | Gangina | |
| 2022/0103427 A1* | 3/2022 | Mallipudi | G06F 8/65 |
| 2023/0168866 A1* | 6/2023 | Balassiano | G06F 8/34 |
| | | | 717/106 |
| 2024/0160558 A1 | 5/2024 | Wille et al. | |

OTHER PUBLICATIONS

"Salesforce DX Developer Guide", Aug. 27, 2020, 233 pages, Retrieved from: https://resources.docs.salesforce.com/226/latesVen-us/sfdc/pdf /sfdx dev. pdf.

"Visualforce Developer Guide", Aug. 20, 2020, 815 pages, Retrieved from: https://resources.docs.salesforce.com/226/latesVen-us/sfdc/pdf/salesforce_pages_developers_guide.pdf.

Chacon, S. and Straub, B., "Pro Git", The Expert's Voice, Second Edition, Jul. 21, 2020, 527 pages, Retrieved from: http://web.archive.org/web/20200801073140/https://gitscm.com/book/en/v2.

Winkelmeyer, R., "Working with Modular Development and Unlocked Packages: Part 4", Jun. 26, 2018, 6 pages, Retrieved from https://developer.salesforce.com/blogs/2018/06/working-withmodular-development-and-unlocked-packages-part-4.

Zayne, T., "Working with Modular Development and Unlocked Packages: Part 1", Jun. 5, 2018, 6 pages, Retrieved from: https://developer.salesforce.com/blogs/2018/06/working-withmodular-development-and-unlocked-packages-part-1.

Zayne, T., "Working with Modular Development and Unlocked Packages: Part 2", Jun. 12, 2018, 9 pages, Retrieved from: https://developer.salesforce.com/blogs/2018/06/working-withmodular-development-and-u n locked-packages-part-2.

Zayne, T., "Working with Modular Development and Unlocked Packages: Part 3", Jun. 19, 2018, 7 pages, Retrieved from: https://developer.salesforce.com/blogs/2018/06/working-withmodular-development-and-unlocked-packages-part-3.

Office Action in corresponding European patent application serial No. 22713093.7 dated May 8, 2025.

International Search Report and Written Opinion in corresponding International Ser. No. PCT/NL2022/050167 dated Jun. 8, 2022.

\* cited by examiner

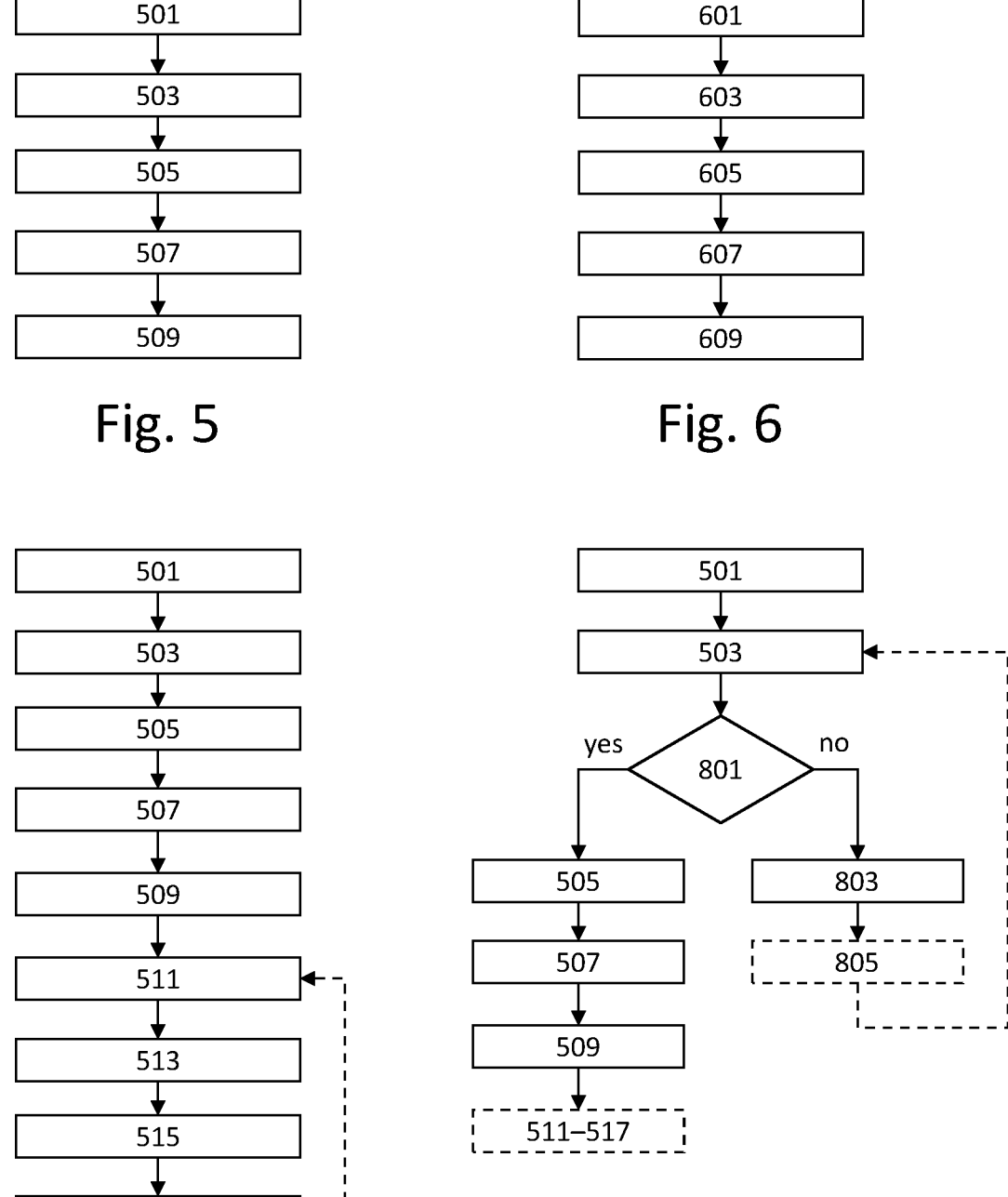

CREATION AND AUTOMATIC UPDATING OF A SOFTWARE APPLICATION

CROSS-REFERENCE TO RELATED APPLICATION(S)

The present application is a Section 371 National Stage Application of International Application No. PCT/NL2022/050167, filed Mar. 25, 2022 and published as WO 2022/211619 A1 on Oct. 6, 2022, and further claims priority to Netherlands patent application no. 2027852, filed Mar. 29, 2021.

FIELD OF THE INVENTION

The invention relates to a system for creating and/or updating of a software application.

The invention further relates to a method of creating and/or updating of a software application.

The invention also relates to computer program products enabling a computer system to perform such a method.

BACKGROUND OF THE INVENTION

Software applications are often provided in the form of pre-defined packages. These package software applications may be described as 'generic', 'business- or domain specific', 'general purpose' or 'one size fits all' software applications. Package software applications provide functionality for a wide array of different users with divergent demands. As a result, package software applications comprise (a lot of) functionality that many users do not use, leading to a waste of resources such as computer memory, network usage, and CPU usage.

A different approach is component-based software. Component-based software applications are typically more resource-efficient than package software applications, as the selection or deselection of included components allows the component-based software application to be tailored, to a greater or lesser degree, to the demands of a user.

However, in order to stay up-to-date, software applications typically need updates, for example, to add new functionality or to fix bugs. For package software-applications, this may result in a new version of the entire package. For component-based software applications, an update to one component may also affect other components. For example, a system may automatically recompile all components of a multi-component software application that depend upon an updated component.

Thus, for component-based software applications, special care must be taken to maintain compatibility between the updated component and the dependent components, severely limiting the types of changes that can be made. Consequently, changes are typically limited to prevent or reduce changes to component interfaces, in particular limiting changes to data types. Otherwise, dependent components must be manually updated to reflect the changes to the updated component. Manually managing all these different updates would be a lot of work and often involve unnecessary errors.

This problem is especially relevant in software systems with a very large number, e.g., tens to hundreds, of typically small components, where a change in one component may affect dozens or more other components. In order to mitigate this problem, one may use a relatively low number of relatively large components. This way, updates can often be limited to a single component without affecting other components. However, using larger components reduces the advantages of small, flexible, and (individually) easy to maintain components.

SUMMARY OF THE INVENTION

In a first aspect, the invention relates to a system for creating a software application, said software application being based on a subset of a collection of software components, said software application being associated with an application specification defining said subset, said software application being associated with a database. Said system comprises at least one processor configured to select a data element referred to by a software component in said subset of software components, said data element being stored in a catalogue and associated with a unique identifier, said data element not being implemented by said software component; search, based on the unique identifier, for a further software component in said subset which implements said data element; determine an database element, said database element being associated with said data element and said database element being identifiable by said unique identifier; generate software for said software application from said application specification, the generation comprising linking, based on said unique identifier, the reference to said data element in said software component to the implementation of said data element by said further software component; and generate database commands to create the database based on at least said determined database elements.

Said software application is typically a web application. Said system may comprise a single device or multiple devices, or multiple virtual devices on one or more physical devices. In the context of this application, a database element may refer to any element associated with a database, e.g., a database table, a database record, or a database field. A data element refers to a data type or field. In some embodiments, a data element may also refer to a process definition or other catalogue entity that is associated with a database element.

By creating the software application in this way, with unique identifiers linking data elements and database elements, it may be ensured that the software application and the associated database can be updated with small effort and low risk of errors. This way, robust and versatile software applications may be composed even by people without a software specialisation, e.g. business analysts, consultants, or key users. In the context of this patent application, any person composing a software application from pre-existing software components is referred to as a software composer. Moreover, the resulting software-application is resource-efficient.

Current software applications can typically be divided into two types: package software applications and tailored software applications. Tailored software applications are typically built specifically to meet the demands of a specific customer. Tailored software applications are usually hard to maintain over time. New functionality is usually implemented in the form of additions to the software application, rather than replacement or deletions. This tends to result in a software application whose efficiency degrades over time, increasing resource consumption. In this context, resource consumption may refer to memory footprint, CPU cycles, database storage space, network usage, energy consumption for running the software application, et cetera.

Package software applications, by contrast, typically have large groups of related functionality. The same software package should meet the needs of large numbers of often diverse users, and hence, package software applications comprise a lot of functionality that many users do not use. As a result, package software applications use more resources.

When a software composer is able to compose a software application by selecting a subset of components from a collection of software components, some of the selected components are normally interrelated. For example, several components may relate to the same database element. If one component is updated to change a property of the database element, all other components in the subset of software components selected for the software application may need to be updated to reflect the change. Furthermore, the database may need to be updated to reflect the change, without loss of stored data.

In an embodiment, said at least one processor is configured to determine that a new version of said further software component is available, said new version of said further software component comprising a new implementation of said data element; generate a new version of said software, the generation comprising linking, based on said unique identifier, the reference to said data element in said software component to the new implementation of said data element by said new version of said further software component; determine changes to said database element between said implementation of said data element and said new implementation of said data element; and generate database commands to update the database based on at least said changes.

Because the data elements (data types or fields and, optionally, process definitions) are referenced by the software components using a unique identifier, a new implementation of a data element may automatically be incorporated in software components referencing the data element. Thus, a new version of a software component may be implemented without having to manually revise some or all related software components. In this application, a new version of a software component may refer to a modification of an existing software component, or a replacement of a software component by a different software component, typically implementing the same data element. Similarly, an update to a software application may refer to an update to one or more components selected for the software application, or a change in the subset of software components selected for the software application, i.e., an addition, removal, or replacement of a software component.

Using such an embodiment, the software application may be updated automatically, without (manual) intervention of, e.g., a programmer. When a software component has been updated. i.e., a new version of the software component has been created, all software applications using the new version of the software component may be automatically identified, based on the application specifications associated with the respective software applications and the unique identifier of the software component. Subsequently, the identified software applications may be automatically recompiled, tested, and/or deployed.

When a software composer is able to select, from a collection of components, the components that the software composer wants to include in the software application, the software composer often needs to assume the role of a software developer and write glue code to let components interact. The glue code refers to the specific components selected by the software composer. With certain (e.g., prescriptive low code) software creation platforms, it is not necessary to write glue code. For example, a software component may refer to data types, data subtypes, and process definitions stored in a catalogue and the development platform can then search for one or more further software components which produces those data types and implements those process definitions, e.g., in the subset of components selected by the software composer of the software application. Optionally, the catalogue may comprise multiple sub catalogues, e.g. one maintained by a composer of the software application and one maintained by the developer of the platform.

With such a software creation platform, when the selected components are integrated, a reference to a data type in a component that consumes data of this data type may be replaced with a reference to the (related) further component that produces data of this data type. Other data elements may be integrated in the same manner.

Moreover, with such a software creation platform, it becomes possible to let the software composer of a software component create or update software components referencing a process definition which is not implemented in the software component itself. The software composer of the software component selects this process definition from the catalogue but does not know yet whether the software composer of the software application will select any further software component that implements this process definition and if so, which one. When the software composer of the software application selects a further software component that implements this process definition, the reference to the process definition is replaced with a reference to this further software component.

Said at least one processor may be configured to receive one or more functionality criteria specifying required functionality of the software application. Said at least one processor may be configured to create and/or update the application specification such that the functionality criteria are met by the software application using a minimal number of software components and/or a minimal number of data elements. In general, there may be several different software components, with potentially different data elements, that meet certain functionality criteria. Selecting software components in a way that minimises the number of software components and/or data elements, results in a smaller software application, leading to a smaller memory footprint, less processor usage, and hence, a smaller consumption of resources. Additionally or alternatively, each software component may be associated with a resource consumption, e.g. a contribution to a size of a compiled executable. This resource consumption may be determined, for example, based on unit tests performed with the software component.

For example, the functionality criteria may specify that the software application needs to be able to process prices of goods, and the plurality of software components may comprise a first software component configured for processing a single currency (corresponding to a single data element representing the price), and a second software component configured for processing multiple currencies (corresponding to two data elements, one for the price and one for the currency). The at least one processor may then be configured to determine that the single-currency software component is smaller than the multiple-currency software component, and consequently select the single-currency software component.

Said at least one processor may be configured to search for said further software component in an application specification associated with said software application, said application specification specifying that said software application comprises one or more software components, said one or more software components including said software component. Said at least one processor may produce an error if said further software component is not found in said subset. For example, a software composer of a software application may first select the components that the software composer wants to include in the software application, which will be specified in the application specification, and if the software component has been selected, a check may take place, e.g. as part of the integration process, whether a further software component has been selected which implements the process definition.

The software application may be associated with configuration information, said configuration information comprising a reference to said data element, said reference comprising said unique identifier. In an embodiment, said at least one processor is configured to update the configuration information based on said change in the implementation of said data element and based on said unique identifier. In an embodiment, generating the database commands comprises generating database commands based on said configuration information and based on said unique identifier. The configuration information may define application-specific parameters, such as default values, templates, and so on. These may be updated based on changes to a software component. For example, a default value that was previously hard-coded may be made application-specific, and may hence need to be added to the configuration information.

Said at least one processor may be configured to search for said further software component in a plurality of application specifications, each application specification being associated with a software application; and select said software application if the application specification associated with said software application comprises said further software component. Said at least one processor may be configured to update the selected software application. Thus, an update that is relevant to all or many software applications implementing a certain software component, e.g., a bug fix or an update based on changed legal requirements, can be quickly and easily provided to all relevant customers. A change to a single component can thus be applied to every software application using said component with little effort.

In an embodiment, a software component in an application specification may be associated with a version identifier and determining database commands may comprise searching for predetermined data conversion commands based on a version identifier of said software component in said application specification and a version identifier of said software component in said new application specification.

In an embodiment, generating software comprises generating software code and said at least one processor may be configured to compile a new software application based on said software code and/or said new software code. Alternatively or additionally, generating software may comprise generating a runnable model and said at least one processor may be configured to interpret and execute said runnable model during runtime.

Said at least one processor may be configured to create or update the database based on the generated database commands. Thus, the update may be effectuated.

Said at least one processor may be configured to create or update a user interface element of a user interface associated with said software application, said user interface element being associated with said implementation of said data element. In some cases, a change in an implementation of a data element may lead to a change in a user interface element; in other cases, a change in a user interface element may lead to a change in a data element implementation.

Said at least one processor may be configured to determine that said software component comprises a reference to a process definition stored in said catalogue, said process definition not being implemented by said software component; search for a further software component which implements said process definition; and if said further software component implements said process definition, generate software for said software application, respectively for said new version of said software application, the generation comprising linking, based on said unique identifier, the reference to said process definition in said software component to the implementation of said process definition by said further software component. If no further software component implements said process definition, said at least one processor may be configured to perform one of the following actions: generating an error message, or generating software for said software application, respectively for said new version of said software application, the generation comprising determining a default return value for said reference to said process definition.

In an embodiment, said configuration information may comprise a reference to said process definition, said reference to said process definition comprising said further unique identifier, and said at least one processor may further be configured to determine that the implementation of the process definition has been changed, and update the configuration information based on said change in the implementation of said process definition and based on said further unique identifier.

Said at least one processor may be configured to determine that the software components in the subset of software components comprise multiple instances of a plug-in; select one instance of the plug-in, preferably an instance having a highest version number among the multiple instances; and replace references to instances that have not been selected with a reference to the selected instance.

In an aspect, the invention relates to a system for updating a software application based on a subset of a collection of software components, said software application being associated with an application specification specifying the subset of software components, said software application being associated with a database. Said system comprises at least one processor configured to determine that a new version of a software component specified in the application specification is available, said new version of the software component comprising a new implementation of a data element, said data element being stored in a catalogue and associated with a unique identifier. Said at least one processor is further configured to search in the application specification for a further software component comprising a reference to said data element, the searching being based on said unique identifier, and updating said reference in said further software component based on the changes in the updated component. Said at least one processor is further configured to generate a new version of said software application, the generation of said new version of said software application comprising linking said reference to said data element in said further software component to said new implementation of said data element by the new version of the software component, the linking being based on the unique identifier. Said at least one processor is further configured to determine changes to said database element between said implementation of said data element and said new implementation of said data element. Said at least one processor is further configured to generate database commands to update said database based on, at least, said determined changes.

The new implementation of the data element can refer to a changed (updated) implementation of a data element implemented by an earlier version of the same software component. The new implementation can also refer to an implementation of a data element that was previously not implemented by a software component defined in the application specification. The new implementation can further refer to an implementation of a data element that was previously implemented by a different software component family.

As will be appreciated by one skilled in the art, the embodiments discussed above with reference to the first aspect may also be implemented as embodiments of the system for updating a software application.

For example, the old software application may comprise a software component implementing data type "currency" as a single currency. The data type is stored in the catalogue. Application-specific configuration information, e.g., a configuration file, may define the single currency to be, e.g., euro. The application database may store prices of goods (in euros) without a currency specification. In the new software application, the software component may be replaced by a software component implementing the data type "currency" with a multi-currency implementation (or alternatively, the old software component may be updated to support multiple currencies). Consequently, all other selected software components that refer to currencies must be updated to support multiple currencies (both the user interface and associated database calls). Furthermore, the database must be updated so that new entries may be entered in multiple currencies, and the existing database entries must be updated (without modification of their values) to reflect their currency, based on the configuration file.

In a system as defined above, a software composer only needs to replace or update the software component implementing the data type "currency", and all other changes are automatically taken care of by the system. Thus, a lean and tightly-tailored, yet easy to maintain software application may be created, saving development time, software storage space, computational overhead, et cetera. Furthermore, creating a software application using this system reduces risk and regression errors.

In a further aspect, the invention relates to a computer-implemented method of creating a software application, said software application being based on a subset of a collection of software components, said software application being associated with an application specification defining said subset, said software application being associated with a database. Said method comprises: selecting a data element referred to by a software component in said subset of software components, said data element being stored in a catalogue and associated with a unique identifier, said data element not being implemented by said software component, said data element preferably being one of: a data type, a data field, a process definition, or a user interface element; searching, based on the unique identifier, for a further software component in said subset which implements said data element; determining an database element, said database element being associated with said data element and said database element being identifiable by said unique identifier; generating software for said software application from said application specification, the generation comprising linking, based on said unique identifier, the reference to said data element in said software component to the implementation of said data element by said further software component; and generating database commands to create the database based on at least said determined database elements.

In an embodiment, said method may further comprise determining that a new version of said further software component is available, said new version of said further software component comprising a new implementation of said data element; generating a new version of said software, the generation comprising linking, based on said unique identifier, the reference to said data element in said software component to the new implementation of said data element by said new version of said further software component; determining changes to said database element between said implementation of said data element and said new implementation of said data element; and generating database commands to update the database based on at least said changes.

Said method may further comprise searching for said further software component in an application specification associated with said software application, said application specification specifying that said software application comprises one or more software components, said one or more software components including said software component. Said method may further comprise producing an error if said further software component is not found in said subset.

The software application may be associated with configuration information, said configuration information comprising a reference to said data element. In an embodiment, said method may further comprise updating the configuration information based on said change in the implementation of said data element and based on said unique identifier. In an embodiment, generating the database commands comprises generating database commands based on said configuration information and based on said unique identifier.

Said method may further comprise searching for said further software component in a plurality of application specifications, each application specification being associated with a software application; and selecting said software application if the application specification associated with said software application comprises said further software component. Said method may further comprise updating the selected software application.

In an embodiment, a software component in an application specification may be associated with a version identifier and determining database commands may comprise searching for predetermined data conversion commands based on a version identifier of said software component in said application specification and a version identifier of said software component in said new application specification.

In an embodiment, generating software comprises generating software code and said method may further comprise compiling a new software application based on said software code and/or said new software code. Alternatively or additionally, generating software may comprise generating a runnable model and said at least one processor may be configured to interpret and execute said runnable model during runtime.

Said method may further comprise creating or updating the database based on the generated database commands. Said method may further comprise creating or updating a user interface element of a user interface associated with said software application, said user interface element being associated with said implementation of said data element.

Said method may further comprise determining that said software component comprises a reference to a process definition stored in said catalogue, said process definition not being implemented by said software component; searching for a further software component which implements said process definition; and generating software for said software application, respectively for said new version of said software application, the generation comprising linking, based on said unique identifier, the reference to said process definition in said software component to the implementation of said process definition by said further software component. If no further software component implements said process definition, said method may further comprise performing one of the following actions: generating an error message, or generating software for said software application, respectively for said new version of said software application, the generation comprising determining a default return value for said reference to said process definition.

In an embodiment, said configuration information may comprise a reference to said process definition, said reference to said process definition comprising said further unique identifier, and said method may further comprise determining that the implementation of the process definition has been changed, and updating the configuration information based on said change in the implementation of said process definition and based on said further unique identifier.

Said method may further comprise determining that the software components in the subset of software components comprise multiple instances of a plug-in; selecting one instance of the plug-in, preferably an instance having a highest version number among the multiple instances; and replacing references to instances that have not been selected with a reference to the selected instance.

In an aspect, the invention relates to a computer-implemented method of updating a software application based on a subset of a collection of software components, said software application being associated with an application specification specifying the subset of software components, said software application being associated with a database. Said method comprises determining that a new version of a software component specified in the application specification is available, said new version of the software component comprising a new implementation of a data element, said data element being stored in a catalogue and associated with a unique identifier. The method further comprises searching in the application specification for a further software component comprising a reference to said data type or field, the searching being based on said unique identifier, and updating said reference in said further software component based on the changes in the updated component. The method further comprises generating a new version of said software application, the generation of said new version of said software application comprising linking said reference to said data element in said further software component to said new implementation of said data element by the new version of the software component, the linking being based on the unique identifier. The method further comprises determining changes to said database element between said implementation of said data element and said new implementation of said data element. The method further comprises generating database commands to update said database based on, at least, said determined changes.

The method may be performed by software running on a programmable device. This software may be provided as a computer program product.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as PHP, Java™, Smalltalk, C++, C #or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which:

FIG. 5 shows an embodiment of the method of creating a software application;

FIG. 6 shows an embodiment of the method of updating a software application;

FIG. 7 shows an embodiment of the method of creating and updating a software application;

FIG. 8 shows a further embodiment of the method of creating and/or updating a software application;

DETAILED DESCRIPTION

Figure 1:
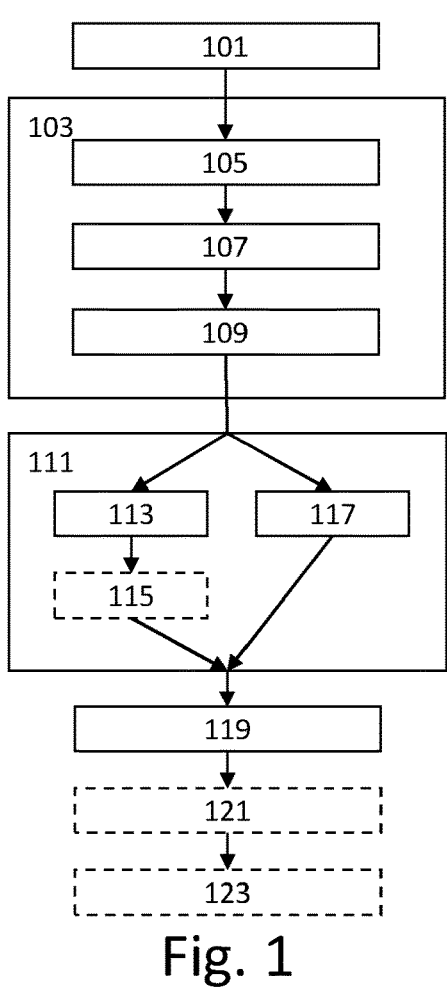
FIG. 1 illustrates a method for creating and/or updating a software application according to an embodiment of the invention.

FIG. 1 illustrates a method for creating and/or updating a software application according to an embodiment of the invention. In a first step 101, the method comprises selecting a subset of software components from a collection of software components. The collection of software components may comprise thousands of components, from which tens to hundreds of software components are selected for a typical software application. A software component typically defines a single, relatively small aspect or function of a software application, such as adding a person to and retrieving a person from a database, or defining a currency. In that aspect, a software component may be considered comparable to a microservice.

The subset of selected software components may be specified in an application specification. A software component in the subset of software components may comprise a reference to a data type, field, or process definition implemented only by a further software component in the subset. In that aspect, they are fundamentally different from microservices which are self-contained. The reference comprises a unique identifier (UID) associated with the data type, field, or process definition. The unique identifier is assigned to the data type, field, or process definition by the system.

Selecting a subset of software components may comprise selecting software components or groups of related software components from a library. The selected components may subsequently be customized to the needs of the user, for example by defining configuration information. As the components can be very small and specialised, the selection of components may result in an application that is finely tuned to the needs of the user. Additionally, customization may be done using 'customization components'; for example, two applications may share the same functional component defining business relations and having the same underlying database structure, but one application may comprise a customization component defining the business relation to be a 'customer', whereas the other application may comprise a different customization component defining the business relation to be a 'client'. Customization components are typically the same as 'normal' components and may differ only in the way they are used. Furthermore, selecting a subset of software components may comprise creating a new software component. The new software component will typically be added to the collection of software components.

In a next step 103, the software components in the subset are integrated. Integration of the software components may also be referred to as 'weaving' the software components. Integrating the software components comprises steps 105-109. Step 105 comprises selecting a data type, field or process that is referenced in a software component and is not implemented by that component. Step 107 comprises searching the further software component implementing the data type, field, or process definition, based on the unique identifier associated with the data type, field, or process definition. Step 109 comprises replacing the reference with or linking the reference to the implementation in the further software component. The integrated software components may be referred to as an application model. The application model may be stored as an XML file.

Based on the application model, software may be generated in a step 111. The software may be generated by generating software code in a step 113, and, optionally, compiling the generated software code into executable code in a step 115. The software code may be generated in any programming language, e.g. PHP, Java, C++, C #, F #, Lisp, or Haskell, that can be used to generate a user interface and to interact with a database. The software code preferably comprises declarative code. Step 111 may alternatively comprise a step 117, the step 117 comprising generating a runnable model. A runnable model may be interpreted at run-time by a suitable interpreter.

A step 119 comprises generating database commands. The database commands may be generated based on a current and/or a previous version of the application model. For example, necessary updates to an existing database may be determined based on a comparison of the current and the previous version of the application model. When executed, the database commands may create or update a database associated with the software application. Database commands to create a database comprise information to associate database elements in the database with a unique identifier. The unique identifier may be used to identify the data type and/or the software component associated with the database element. Database commands to update the database comprise the unique identifier associated with the data type and/or the software component associated with the database element. This will be explained in more detail below with reference to FIG. 3.

Whereas steps 101-117 can be the same, or at least mostly similar, for both the method of creating and the method of updating a software application, step 119 can be very different. When creating a software application, the database commands may create the relevant database or databases and, when necessary, create one or more database tables. When updating a software application, existing data in the database must be retained and, when applicable, modified. For example, in an old version of a database, an address may be stored as a single string comprising street name and house number, while in the new version of the database, street name and house number may be stored in separate fields, thus requiring the existing address lines to be split. As another example, a database field in a first database table may comprise a reference to a second database table. Consequently, if e.g. the name of the second database table is changed, the reference in the database field in the first database table must be updated to correspond to the changed name.

An optional step 121 comprises executing the database commands. Executing the database commands creates and/ or modifies the database associated with the software application. An optional step 123 comprises executing the executable code and/or interpreting the runnable model, thus running the software application.

Figure 2:
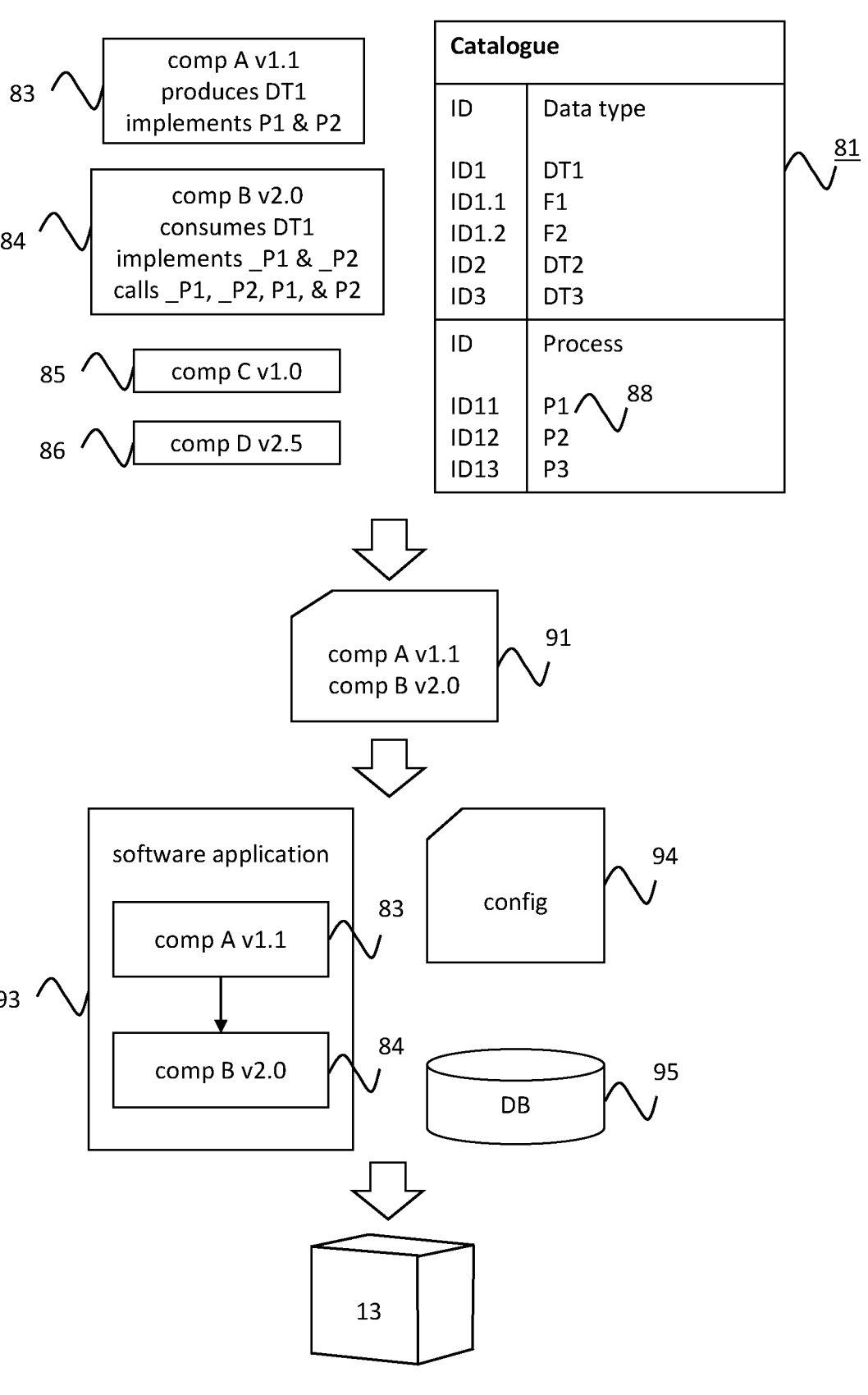
FIG. 2 illustrates the operation of an example platform for composing a software application from software components.

FIG. 2 illustrates the operation of an example platform for composing a software application from software components. With this example platform, a composer is able to compose a software application by selecting a subset of components from a collection of software components for example as described above with reference to step 101 in FIG. 1.

With this example platform, it is not necessary to write glue code. Instead, a software component refers to data types, fields and process definitions stored in a catalogue and the development platform can then search for one or more further software components which produces those data types and fields, and implements those process definitions. The development platform may search, for example, in the subset of components selected by the composer of the software application. In some embodiments, the development platform may also search in the collection of (unselected) software components, in particular when a software component producing the data type, field, or process definition is not found in the subset of selected software components.

When a software component comprises a reference to a data type, field, or process definition not implemented by that software component, the software component is said to 'consume' the data type, field, or process definition. A software component may modify, e.g. add to, a consumed data type.

In the remainder of this description, whenever 'data type' is mentioned, 'field', 'process definition' or 'user interface element' may be read instead, unless such reading is not applicable. A 'component' refers to a 'software component', unless implicitly or explicitly specified otherwise.

With this example platform, when the selected components are integrated, a reference to a data type, specified in a component that consumes data of this data type, may be complemented with a reference to the further component that produces data of this data type. An example of integration of components is step 103 in FIG. 1. This way, robust and versatile software applications may be composed even by people without a software specialization, e.g. business analysts, consultants or key users.

In the example of FIG. 2, four software components 83-86 have been developed by software developers and have been included in a component library. In practice, thousands of software components may be included in a component library. Furthermore, different versions of a software component may be included in the component library. In this description, the different versions of a software component are collectively referred to as a component family. In the example of FIG. 2, component 83 is version 1.1 of a component family A, component 84 is version 2.0 of a component family B, component 85 is version 1.0 of a component family C, and component 86 is version 2.5 of a component family D.

Each component may produce one or more data types and/or may consume one or more data types. This is specified by the component developer. The component developer selects from a catalogue which data types are produced by his software component and which data types are consumed by his software component. If the component developer wants his software component to produce a new data type, i.e., a data type not yet stored in the catalogue, he typically needs to ask the owner of the catalogue to add this data type to the catalogue. Existing entries in a catalogue are typically not modified, but the catalogue can be extended with new entries.

In the example of FIG. 2, the catalogue 81 comprises three data types DT1, DT2, and DT3. Each of the data types is associated with an identifier (ID1, ID2, and ID3 respectively in the example of FIG. 2). A data type may comprise one or more fields or attributes, each of which is associated with a respective identifier. In the example of FIG. 2, data type DT1 comprises two fields, F1 and F2 with respective identifiers ID1.1 and ID1.2.

In the example of FIG. 2, component 83 produces data of data type DT1 and component 84 consumes data of data type DT1. For the sake of simplicity, FIG. 2 does not show which data types are consumed or produced by components 85 and 86. The identifier of DT1, i.e. ID1, is stored in the software components 83 and 84.

Each component may implement one or more processes and typically implements multiple processes. Some components may, e.g., only affect the user interface, without implementing any process. For each process that should be callable by another component, a process definition is stored in the catalogue. In the example of FIG. 2, no process definitions are stored in the catalogue for processes that do not need to be callable by another component, but it would be possible to store process definitions for these processes as well. In the example of FIG. 2, the component 83 implements processes P1 and P2 that should be callable by other components and component 84 implements processes _P1 and _P2 that do not need to be callable by other components and indeed are not callable by other components. Component 84 calls processes _P1, _P2, P1, and P2.

The component developer selects from a catalogue which process definitions are called by his software component and which process definitions are implemented by his software component. If the component developer wants his software component to implement a new process type, he typically needs to ask the owner of the catalogue to add this process definition to the catalogue. In the example of FIG. 2, the developer of component 84 does not need to select process definitions for processes _P1 and _P2, as they do not need to be called by other components and are therefore not stored in catalogue 81.

For the sake of simplicity, FIG. 2 does not show which processes are implemented and called by components 85 and 86 or which processes are called by component 83.

In the example of FIG. 2, the catalogue 81 comprises three process definitions: a process definition 88 for P1 and process definitions for P2 and P3. Each of the process definitions is associated with an identifier (ID11, ID12, and ID13 respectively in the example of FIG. 2).

A composer can select the software components that he wishes to include in his software application from the component library. This results in an application specification. A typical application specification comprises tens to hundreds of software components. In the example of FIG. 2, the composer first selects a component 84 that consumes data of data type DT1 and then selects a component 83 that produces data of this data type DT1. This is reflected in the application specification 91. In general, there may be multiple components in the component library that produce data of the same data type. If a data type is consumed by a component in the application specification, there is preferably exactly one component that produces that data type in the application specification. For required data types, there is preferably exactly one component producing that data type and for optional data types that are preferably zero or one components producing that data type in the application specification. However, in other embodiments, there may be multiple components producing the same data type specified in the application specification; in these embodiments, the correct component may, e.g., be selected based on context. There is no limit on the amount of components in the application specification that consumes a given data type.

After the composer has selected the desired components, he can instruct the system to create or update a software application. If the composer is creating a new software application, he may select all desired components manually. However, in some embodiments, the composer may also select predefined sets of components, e.g. sets of components that are often selected together and have related functionality. He may also use a copy of an existing application specification as a starting point. When updating a software application, the composer typically uses the components selected for a previous version of the software application. In either case, the composer may then add components to add functionality, remove components to remove unwanted and/or unused functionality, exchange components, or make other changes to one or more components. This way, the software application may be fine-tuned to the requirements of the user.

In the example of FIG. 2, the system creates a software application 93 and further creates a configuration 94 and a database 95. An example of creating a software application is step 111 in FIG. 1. In the example of FIG. 2, the components 83 and 84 are woven together in order to create the software application 93. As part of this process, the reference to the data type DT1 in component 84 is linked to the component 83. Next, code may be generated based on the results of this weaving process. Alternatively, a runnable model may be generated based on these results.

Thus, the created software application comprises code or a runnable model. In the created software application, the individual components may no longer be distinguishable. In a preferred embodiment, however, each element in the software application, e.g. a user interface element or a database element, can be traced back to the software component that implements that element. Thus, if a specific element needs to be updated or fixed, the relevant software component can easily be identified. A unique identifier may be used to identify the software component responsible for each element in the software application.

In the example of FIG. 2. The created software application is transferred to a system 13 where the software application is deployed. System 13 executes the code or interprets the model of the software application. In other examples, the software application may be deployed on the same system where the software application was composed. The software application is typically a web application. The software application may run on a server and may be used using a client device connected to the server.

Figure 3:
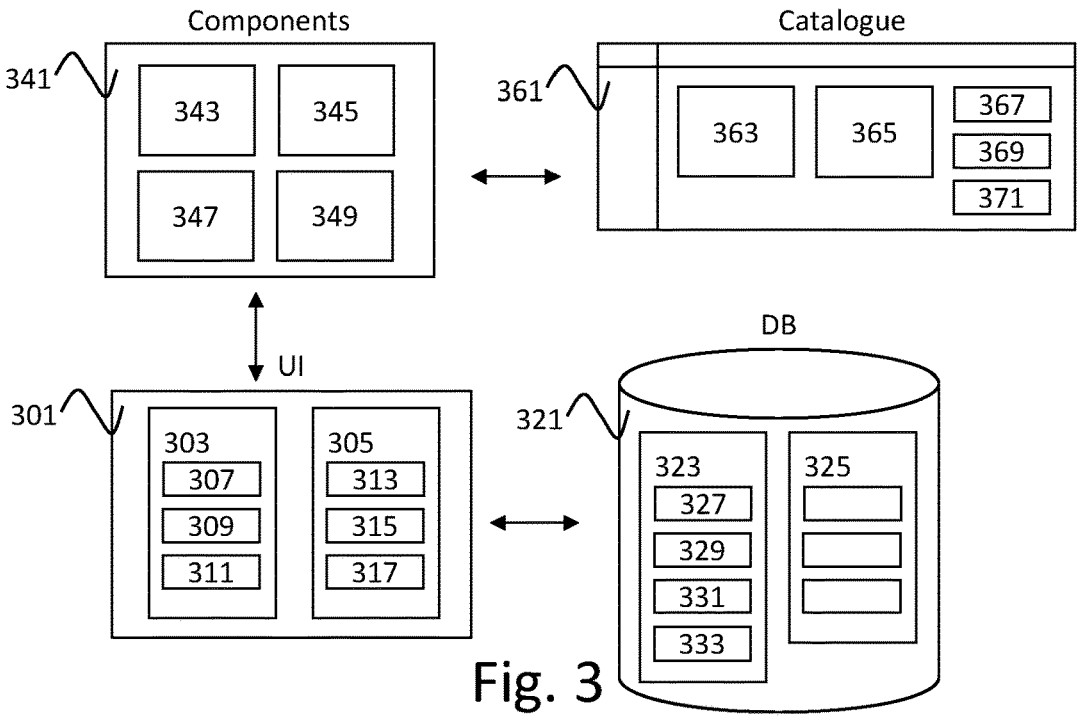
FIG. 3 illustrates a method of composing a software application from software components.

FIG. 3 illustrates a method of composing a software application from software components. A composer may compose an application by selecting and/or creating components, as described above with reference to step 101 in FIG. 1. Creating a component may comprise drawing a user interface (UI) 301. A user interface typically comprises one or more 'pages' or screens to enter and/or display data. For simplicity, the example in FIG. 3 only shows a page 303 for adding a new customer or editing an existing customer, and a page 305 for displaying a customer. In other embodiments, the same page may be used for displaying, adding, and editing a customer. Similar pages may exist for e.g. managing products and other data types (not shown). Schematic contents of the pages 303, 305 are shown in Table 1.

may correspond to database 95 of FIG. 2. Button 311 may be linked to a process 369 (discussed in more detail below)

TABLE 1

| Schematic overview of a first page 303 and a second page 305 of a user interface 301. | | | |
|---|---|---|---|
| Page 1 | | Page 2 | |
| Page [ID4.1] | Add/edit customer [ID 1.1] | Page [ID4.2] | Display customer [ID1.1] |
| UI Field [ID4.1.1] | First Name [ID1.1.1] | UI Field [ID4.2.1] | Full Name [ID1.1.3] |
| UI Field [ID4.1.2] | Last Name [ID1.1.2] | UI Field [ID4.2.2] | Number [ID1.1.4] |
| UI Field [ID4.1.3] | Product Name [ID1.2.1] | UI Field [ID4.2.3] | Product Name [ID1.2.1] |
| UI Button [ID4.1.4] | Save [ID2.2] | UI Button [ID4.2.4] | Add [ID2.1] |
| | | UI Button [ID4.2.5] | Edit [ID2.3] |

The page 303 comprises a title 307, fields 309 and a clickable button 311. A shown in Table 1, first column, fields 309 comprise a first field with a first ID "ID4.1.1" which may be used to enter a customer's first name, a second field with a second ID "ID4.1.2" which may be used to enter the customer's last name, and a third field with ID "ID4.1.3" which may be used to enter the product the customer bought. Each user interface element is associated with a unique identifier. The identifier is typically not visible in the user interface, but may be present in the code or model for displaying the user interface. For example, the user interface may be generated in HTML and each element may be coupled to an identifier.

Additionally, a user interface element is typically associated with a data element using the unique identifier of that data element. In this example, UI Field "ID4.1.1" implements attribute 'First Name' of data type 363 'Person', and this attribute has identifier "ID1.1.1" as defined in catalogue 361. Similarly, UI Field "ID4.1.2" implements attribute 'Last Name', having identifier "ID1.1.2". By identifying the data elements with a unique, immutable identifier stored in a catalogue, data elements may be reliably identified between different components and between different versions of the same component family, even if, e.g., the name of the data element has changed. For example, a new version of component 343 might use "Surname" instead of "Last name". Based on the identifier which has not changed, the system can determine that "Surname" and "Last name" refer to the same real-world entity. Thus, the system may determine that database field 329 should be renamed from "Last name" to "Surname" and that the data stored in that field should be kept. Without the ID, in order to prevent the system from deleting the column "Last name" and creating a column "Surname" (thus deleting, or at least making inaccessible, the data stored in the column "Last name"), a developer would either have to specify the change by writing his own code, or would simply be prevented from making such changes.

In the description of FIG. 3 and Tables 1-4, the example IDs are generated sequentially and are based on the object (e.g., data element, user element, process definition, et cetera) the ID is associated with. However, as may be appreciated by the skilled person, in principle any known method to generate unique IDs may be used. The IDs in this example have been chosen primarily for the sake of clarity of the description. Unique IDs should at least be locally unique, but are preferably globally unique.

In this example, the first and second fields may be implemented as free text fields, while the third field may be implemented as a selection field, e.g. a drop down menu, allowing only product names that are stored in the database 321 associated with the software application. Database 321 to save the entered information in the database 321. The process may comprise validation steps to determine whether the input is valid and may comprise information to provide a warning or error.

The page 305 comprises a title 313, fields 315 and two clickable buttons 317. A shown in Table 1, second column, fields 315 comprises a first field with ID "ID4.2.1" which may display the customer's full name. The customer's full name may be based on a concatenation of the customer's first name and the customer's last name. The customer's full name may be implemented as a function which takes two data fields as input and provides the full name as output. In the example shown in FIG. 3, the full name is computed each time it is needed. In other cases, a function may be precomputed and cached in the database. Fields 315 comprises a second field with ID "ID4.2.2" which may display the customer's customer number. The customer number may be generated by the software application independent of the user's input on page 303.

TABLE 2

| Schematic overview of a first table 323 and a second table 305 of a database 321. | | | | |
|---|---|---|---|---|
| Table 1 | | Table 2 | | . . . |
| Table | Customer [ID1.1] | Table | Product [ID1.2] | . . . |
| DB Field | First Name [ID1.1.1] | DB Field | Name [ID1.2.1] | |
| DB Field | Last Name [ID1.1.2] | DB Field | Price [ID1.2.2] | |
| DB Field | Product Name [ID1.2.1] | DB Field | Stock [ID1.3.1] | |
| DB Field | Number [ID1.1.4] | | | |

In the depicted embodiment, a data model may be determined based on the designed user interface. In a different embodiment, the user interface could be derived from a designed database or data model. Typically, a page 303, 305 in the user interface 301 corresponds, when the software application is deployed, to a table 323, 325 in the database 321. In the example of FIG. 3, and as shown in Table 2, the database 321 comprises a table 323 with ID "ID1.1" for 'Customers' and a table 325 with ID "ID1.2" for 'Products'. The table 323 for 'Customers' comprises a field 327 with ID "ID1.1.1" for storing a customer's first name (provided in UI Field 309 with ID "ID4.1.1"), a field 329 with ID "ID1.1.2" for storing the customer's last name (provided in UI Field 309 with ID "ID4.1.2"), a field 331 with ID "ID1.2.1" for storing the customer's product (provided in UI Field 309 with ID "ID4.1.3"), and a field 333 with ID "ID1.4" for storing a customer's customer number. DB Fields 327-331 are created based on the fields 309 on page 303. DB Field 333 is created based on field 315 with ID "ID4.2.2" on page 305. The IDs of the data elements in the database 321 can be determined based on the corresponding data elements in the user interface 301, and vice versa. In this example, the IDs of the data elements in the database 321 are equal to the corresponding data elements in the user interface 301. In other embodiments, the IDs may be different, but can be related by, e.g., having a part of the ID in common or by being obtainable via a invertible function.

a list of the identifiers of all user interface elements generated by the component, but other solutions are also possible. For example, each UI element may (additionally or alternatively) be associated with the identifier of the component that generated the JI element.

TABLE 3

Schematic overview of a first component 343 and a
second component 345 of a subset of components 341.

| Component 1 | | Component 2 | |
|---|---|---|---|
| Component | Customer [ID3.1] | Component | Product [ID3.2] |
| Produces | Person [ID1.1] | Produces | Product [ID1.2] |
| Consumes | Product [ID1.2] | Consumes | [none] |
| UI Field [ID4.1.1] | First Name [ID1.1.1] | UI Field [ID4.3.1] | Name [ID1.2.1] |
| UI Field [ID4.1.2] | Last Name [ID1.1.2] | UI Field [ID4.3.2] | Price [ID1.2.2] |
| UI Field [ID4.2.1] | Full Name [ID1.1.3] | UI Field [ID4.3.3] | Stock [ID1.3.1] |
| UI Field [ID4.2.2] | Number [ID1.1.4] | UI Button [ID4.3.4] | Add [ID2.1] |
| UI Field [ID4.1.3] | Product Name [ID1.2.1] | UI Button [ID4.3.5] | Save [ID2.2] |
| UI Field [ID4.2.3] | Product Name [ID1.2.1] | UI Button [ID4.3.6] | Edit [ID2.3] |
| UI Button [ID4.2.4] | Add [ID2.1] | | |
| UI Button [ID4.1.4] | Save [ID2.2] | | |
| UI Button [ID4.2.5] | Edit [ID2.3] | | |

In general, a page 303, 305 in the user interface 301 may be based on a plurality of software components 343, 345 out of a collection 341 of software components 343-349. The software components selected for a software application are specified in an application specification. For example, as is shown in Table 3, software component 343 'Customer' produces a data type 363 'Person' by coupling the data type to a user interface element such as a page 303, in this example a page for adding customers. Based on this UI element, a database command to create a database table 'Customers' may be generated. A component can be associated with a plurality of UI pages. A component may be associated with UI pages for a plurality of data types.

A field on a page typically corresponds to a field in the table corresponding to the page. A page in the user interface may further comprise one or more clickable buttons which are typically associated with processes, e.g. an 'edit' button 323 and a 'save' button 313. Because of the integration, there is no distinction in the software application between UI elements coupled to the producing component and UI elements coupled to consuming components, although each element may be traced back to the respective component that added the element, based on the element's identifier.

TABLE 4

Schematic overview of a catalogue 361 comprising a first data type
363, a second data type 365 and three process definitions 367-371.

| Data Type | Person [ID1.1] | Data Type | Product [ID1.2] |
|---|---|---|---|
| Attribute | First Name [ID1.1.1] | Attribute | Name [ID1.2.1] |
| Attribute | Last Name [ID1.1.2] | Attribute | Price [ID1.2.2] |
| Attribute | Full Name [ID1.1.3] | | |
| Attribute | Number [ID1.1.4] | | |
| Process def. | Add [ID2.1] | Process def. | Save [ID2.2] | Process def. | Edit [ID2.3] |

In the depicted example, component 343 is associated with a first UI page 303 for adding/editing a customer and with a second UI page 305 for displaying the customer. A further software component (not shown in this example) may consume the data type and couple the data type to a 'virtual' UI element, e.g. a virtual page. A virtual page cannot exist independently and does not, itself, lead to a database table. However, a virtual page may comprise (additional) fields, forms, functions, et cetera. During the integration step, the content of the virtual page is moved to the corresponding actual page coupled to the software component that produces the consumed data type. The database command is adjusted to create a modified database table to account for the elements added on the virtual page. Each UT element can be traced back to the component adding the UI element through an identifier. As shown in Table 3, in the depicted example, each component maintains As was described above, a component may produce, i.e., implement, one or more data types 363, 365 and may consume, i.e., use without implementing, one or more data types 363, 365. A component may also implement one or more process definitions 367371. The data types and process definitions are stored in a catalogue 361. Table 4 shows two examples of data types and three examples of process definitions.

A data type comprises one or more attributes. An attribute can be a data field or a function. Attributes may also be grouped together in a feature, so that they will always be produced or consumed together. For example, the data type 'Person' may have a feature 'Name', which consists of the two attributes 'Last name' and 'First name'. Each data type and each attribute in a data type is associated with a unique identifier. A process definition may have zero or more parameters, e.g., process arguments, and zero or more potential return values. Each process definition, each parameter for a process definition, and each potential return value is associated with a unique identifier.

For example, a process definition could be 'find address based on postal code', which could define parameters 'postal code', 'house number', and 'country', and define potential return values 'success', 'error'. 'street name' and 'city name', each of which would have a unique identifier. A process typically comprises multiple process steps. For example, the process definition 'find address based on postal code' might be followed by process steps that either fill in the street name and city name, or generate an error message, based on the output. Such a process could be coupled to e.g. a UI field for entering a postal code and/or to a UI field for entering a house number. The process could also be coupled to a button, e.g. as part of a "Save" process.

A process definition typically defines only a single process step or a small amount of process steps. In some embodiments, processes may be nested, and a process step may in turn comprise one or more further process steps, each of which may comprise even further process steps. This way, the number of process definitions can be kept small while maintaining customizability. The implementation of a process definition may contain references process definitions implemented by other components and/or to other processes implemented by the component itself.

Data types may be classified using an ontology. In computer science and information science, an ontology encompasses a representation, formal naming and definition of the categories, properties and relations between the concepts, data and entities that substantiate one, many, or all domains of discourse. More simply, an ontology is a way of showing the properties of a subject area and how they are related, by defining a set of concepts and categories that represent the subject.

The ontology may thus be used as a classification scheme. By classifying a real-world concept based on its properties and relations to other concepts, concepts that may initially appear to be rather different may be mapped onto the same data type. For example, both an insurance and a computer server may be described using the data type 'system' based on shared properties such as 'can be sold', 'has an owner', 'may be mutated after sale'. This way, the size of the catalogue is kept manageable, and reusability of data types is maximised. This, in turn, reduces resources needed for storage, maintenance and updating of data types.

If necessary, the data type may be expanded with optional attributes that are applicable only to some concepts. For example, the data type 'system' can have an optional attribute policy number that is applicable to insurances, but not to computer servers. This way, a high degree of customizability is achieved.

A data type typically corresponds to a concept, e.g. a 'person' or a 'currency' which describes the real world. A data type comprises one or more attributes, for example, a person may have a first name and a last name. An attribute can be a field, a data type, or a function. For example, the data type 'person' can have field-type attributes 'first name' and 'last name'. The data type 'person' can also have a function-type attribute 'full name' which may take the person's first name and last name as input and return a concatenation as output. An attribute can also itself be a data type, e.g., the data type 'person' may have an attribute 'address' which can be data type comprising attributes such as 'street name', 'house number', 'postal code', et cetera. The data type 'address' can also be an attribute of a further data type, e.g., 'company'.

In an embodiment, the catalogue may define that a data type may have required attributes and optional attributes. In such an embodiment, each component implementing a data type must at least implement the required attributes. Optional attributes may be given a default value. For example, 'first name' and 'last name' can be required attributes of the data type 'person', while 'date of birth' can be an optional attribute. In that case, each component that implements the data type 'person' must implement the required attributes. Thus, each person that is entered into the database would have to have a 'first name' and a 'last name', but, for example, only employees also have their 'date of birth' registered, while customers do not.

Alternatively or additionally, a component referring to a data type or attribute may specify whether the data type or attribute is required or optional. For optional attributes, the component must specify a default value. For example, a component may refer to the data type 'Person' and its attribute 'Gender', of type Gender, which is an enumeration of 'Male', 'Female', 'Other', and 'Unknown'. The component may specify that this attributed is consumed optionally, and that its default value is 'Unknown'. In this example, when the application specification does not contain a component producing the attribute 'Gender', all references to the attribute 'Gender' will be replaced with the fixed value 'Unknown'. This replacement is typically performed during the integration step, e.g. as part of step 109 in FIG. 1. Thus, the component may refer to a data type or attribute without necessarily consuming it.

Alternatively or additionally, a component may specify for each field whether it is required or optional. For example, a field can be associated with a validation process step which can specify that a field must have a value, e.g., that the value for 'first name' and 'last name' may not be empty. The validation process step may also put further constraints on the value of a field, such as on its type (e.g., numeric or alphanumeric) or on its relation to a value of a different field or parameter (e.g., a date that must be before or after a date specified in a different field, or before or after the current date). This validation step is typically performed during run-time.

Alternatively or additionally, required and optional attributes may be specified by a process using the data type, e.g. taking a data type as an argument. For example, a process definition and/or a process implementation may specify that the process can only be used with a data type implementing certain attributes. For example, a process taking a data type 'Person' as an argument may specify that the 'Person' must have an implementation for both 'first name' and 'last name'.

In certain object-oriented programming languages, e.g., PHP, Java, C++, or C #, a data type may be implemented as a class, and an attribute may be implemented as a member of that class.

A data type thus typically corresponds to a page in the user interface and to a table in the database. An attribute typically corresponds to a field on the page and to a field in the database or to a function based on such fields.

Figure 4A:
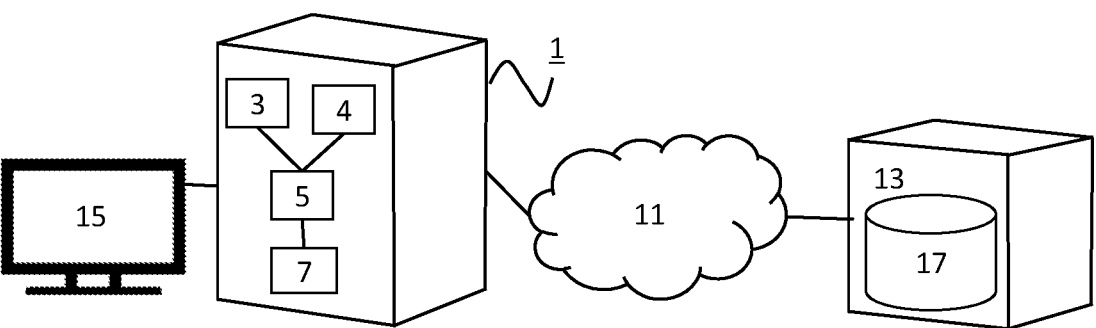
FIG. 4A shows a first embodiment of the system for creating and/or updating a software application and FIG. 4B shows a second embodiment of the system for creating and/or updating a software application.

FIG. 4A shows a first embodiment of the system for creating and/or updating a software application, said software application being based on a subset of a collection of software components. In this first embodiment, the system is a computer 1. A composer uses the computer 1 and a monitor 15 connected to the computer 1 to create and/or update the software application. The software application is associated with an application specification defining the subset of software components. In the example of FIG. 4A, the software application is deployed on a server 13. The software application is associated with a database 17. The database may be stored on the server 13. The database may store data received as input by the software application.

The computer 1 comprises a processor 5, and storage means 7. The computer may also comprise a receiver 3, and a transmitter 4. The processor 5 is configured to select a data type, field, or process definition referred to by a software component in the subset of software components. The data type, field, or process definition is stored in a catalogue and is associated with a unique identifier. The data type or field is not implemented by the software component.

The processor 5 is further configured to search, based on the unique identifier, for a further software component in the subset which implements the data type, field, or process definition and to generate software for the software application from the application specification. The generation of software comprises linking, based on the unique identifier, the reference to the data type, field, or process definition in the software component to the implementation of the data type by the further software component.

The processor 5 may be configured to search for the further software component in the application specification 91 associated with the software application 93. The application specification specifies that the software application comprises one or more software components, the one or more software components including the software component.

The processor 5 is further configured to determine a database element, and to generate database commands to create the database based on at least the determined database elements. The database element is associated with the data type or field and is identifiable by the unique identifier. The database element may refer to any element associated with a database, e.g., a database table, a database record, or a database field.

The processor 5 may be further configured to determine that a new version of the further software component is available. The new version of the further software component may comprise a new implementation of the data type or field.

The processor 5 may be further configured to generate a new version of the software, the generation comprising linking, based on the unique identifier, the reference to the data type or field in the software component to the new implementation of the data type or field by the new version of the further software component.

The processor 5 may be further configured to determine changes to the database element between the implementation of the data type or field and the new implementation of the data type or field. The processor 5 may be further configured to generate database commands to update the database based on at least the changes.

The processor 5 may be configured to generate executable code or a runnable model based on the software or the new version of the software.

In the embodiment shown in FIG. 4A, the steps of creating and/or updating the software application are executed by the same computer system. The created or updated software application may be deployed on a server 13. The software application may be uploaded over the Internet, or may be transferred using other means. The server 13 may be configured to execute the executable code or to interpret the runnable model. The server 13 may be configured to execute the database commands.

By creating the software application in this way, it may be ensured that the software application and the associated database can be updated with small effort and low risk of errors. This way, robust and versatile software applications may be composed even by people without a software specialisation, e.g. business analysts, consultants, or key users. In the context of this patent application, any person composing a software application from pre-existing software components is referred to as a software composer.

When a software composer is able to compose a software application by selecting a subset of components from a collection of software components, some of the selected components are normally interrelated. For example, several components may relate to the same database element. If one component is updated to change a property of the database element, all other components in the subset of software components selected for the software application may need to be updated to reflect the change. Furthermore, the database may need to be updated to reflect the change, without loss of stored data.

Figure 4B:
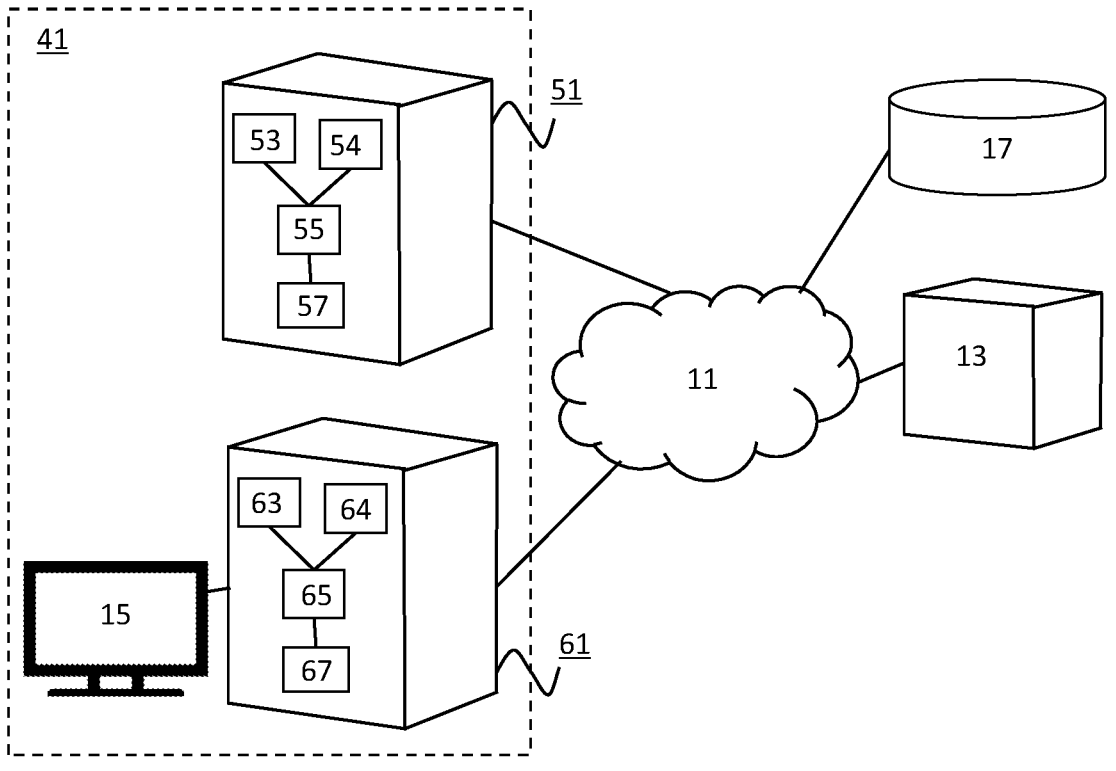

FIG. 4B shows a second embodiment of the system for creating and/or updating a software application. In the embodiment of FIG. 4B, the system 41 comprises a computer 61 and a server 51. The computer 61 comprises a receiver 63, a transmitter 64, a processor 65, and storage means 67. The server 51 comprises a receiver 53, a transmitter 54, a processor 55, and storage means 57.

The processor 55 of the server 51 is configured to select a data type or field referred to by a software component in the subset of software components. The processor 55 is further configured to search, based on the unique identifier, for a further software component in the subset which implements the data type or field.

The processor 65 of the server 61 is configured to generate software for the software application from the application specification. The processor 65 of the server 61 is further configured to determine a database element, and to generate database commands to create the database based on at least the determined database elements.

The server 13 may be configured to execute the executable code or to interpret the runnable model. The database 17 may be configured to execute the database commands.

In the embodiment of the computer 1 shown in FIG. 4A, the server 51 shown in FIG. 4A, and the server 61 shown in FIG. 4A, the device comprises one processor 5, 55, or 65. In an alternative embodiment, the device comprises multiple processors. The processor 5, 55, or 65 may be a general-purpose processor, e.g. from Intel or AMD, or an application-specific processor. The processor 5, 55, or 65 may run a Windows or Unix-based operating system for example. The storage means 7, 57, or 67 may comprise one or more memory units. The storage means 7, 57, or 67 may comprise one or more hard disks and/or solid-state memory, for example. The storage means 7, 57, or 67 may be used to store an operating system, applications and application data, for example.

The receiver 3, 53, or 63 and the transmitter 4, 54, or 64 may use one or more wired and/or wireless communication technologies such as Ethernet and/or Wi-Fi (IEEE 802.11) to communicate with other devices via the Internet 11. In an alternative embodiment, multiple receivers and/or multiple transmitters are used instead of a single receiver and a single transmitter. In the embodiments shown in FIGS. 4A and 4B, a separate receiver and a separate transmitter are used. In an alternative embodiment, the receiver and the transmitter are combined into a transceiver. The device may comprise other components typical for a computer/server such as a power connector. The invention may be implemented using a computer program running on one or more processors.

In general, the system may comprise a single device or multiple devices, or multiple virtual devices on one or more physical devices.

An embodiment of the computer-implemented method of creating a software application based on a subset of a collection of software components is shown in FIG. 5. The software application is associated with an application specification defining the subset of software components. The software application is associated with a database. The database may store data received as input by the software application. The method may be performed by the computer 1 of FIG. 4A or the computers 51 and 61 of FIG. 4B, for example. The database may be stored on the computer, e.g., a server, running the software application, or on a different server.

A step 501 comprises selecting a data type or field referred to by a software component in the subset of software components. The data type or field is stored in a catalogue and associated with a unique identifier. The data type or field is not implemented by the software component.

A step 503 comprises searching, based on the unique identifier, for a further software component in the subset which implements the data type or field. A step 505 comprises determining a database element. The database element is associated with the data type or field. The database element is identifiable by said unique identifier.

A step 507 comprises generating software for the software application from the application specification. The generation of software comprises linking, based on the unique identifier, the reference to the data type or field in the new software component to the implementation of the data type by the further software component.

A step 509 comprises generating database commands to create the database based on at least the determined database elements.

An embodiment of the computer-implemented method of updating a software application based on a subset of a collection of software components is shown in FIG. 6. The software application is associated with an application specification defining the subset of software components. The software application is associated with a database. The database may store data received as input by the software application. The method may be performed by the computer 1 of FIG. 4A or the computers 51 and 61 of FIG. 4B, for example. The database may be stored on the computer, e.g., a server, running the software application, or on a different server.

A step 601 comprises determining that a new version of a software component specified in the application specification is available. The new version of the software component comprises a new implementation of a data type or field. The new implementation of the data type or field can refer to a changed (updated) implementation of a data type or field implemented by an earlier version of the same software component. The new implementation can also refer to an implementation of a data type or field that was previously not implemented by a software component defined in the application specification. The new implementation can further refer to an implementation of a data type or field that was previously implemented by a different software component family. The data type or field is stored in a catalogue and associated with a unique identifier.

A step 603 comprises searching, based on the unique identifier, for a further software component in the application specification comprising a reference to said data type or field. The reference in said further software component is updated based on the changes in the updated component.

A step 605 comprises generating a new version of the software application. The generation of the new version of the software application comprises linking the reference to the data type or field in the further software component to the new implementation of the data type or field by the new version of the software component. The linking is based on the unique identifier.

A step 607 comprises determining changes to the database element between the implementation of the data type or field and the new implementation of the data type or field. A step 609 comprises generating database commands to update the database based on, at least, the determined changes.

In an embodiment, the method of creating a software application shown in FIG. 5 and the method of updating a software application shown in FIG. 6 may be combined into a method for creating and updating a software application. For example, steps 601-609 may be performed after steps 501-509. Alternatively, the methods shown in FIG. 5 and FIG. 6 may be combined, mutatis mutandis, as shown in FIG. 7. The software application is based on a subset of a collection of software components. The software application is associated with an application specification defining the subset of software components. The software application is associated with a database. The database may store data received as input by the software application.

The steps 501-509 are as described above with reference to FIG. 5.

A step 511 comprises determining that a new version of the further software component is available. The new version of the further software component comprising a new implementation of the data type or field. In some cases, the new version of the further software component may refer to a software component of a different component family, at least partly replacing the component family to which the further software component belongs.

A step 513 comprises generating a new version of the software. The generation comprises linking, based on the unique identifier, the reference to the data type or field in the software component to the new implementation of the data type or field by the new version of the further software component.

A step 515 comprises determining changes to the database element between the implementation of the data type or field and the new implementation of the data type or field. A step 517 comprises generating database commands to update the database based on at least the determined changes.

Some changes to database elements can be determined automatically by the system. In such cases, the database commands may also be generated automatically. For example, an element may be renamed, or a simple datatype (such as an integer number, floating point number, or text string) may be changed into a different simple datatype.

In other cases, a composer—or, for more complex cases, a software developer—may specify how database elements must be changed based on a change to a software component. In such cases, the database commands may be based on information associated with the software component, typically provided by the composer or software developer.

If there have been multiple changes in the implementation of a data type between multiple versions of a software component, the change to the database element may depend on the version of the software component being updated. Thus, in an embodiment, a software component in an application specification may be associated with a version identifier. In such an embodiment, step 515 may comprise searching for predetermined data conversion commands based on a version identifier of the software component in the application specification and a version identifier of the software component in the new application specification.

Because the data types are referenced by the software components using a unique identifier, a new implementation of a data type may automatically be incorporated in software components referencing the data type. Thus, a new version of a software component may be implemented without having to manually revise some or all related software components. In this application, a new version of a software component may refer to a modification of an existing software component, or a replacement of a software component by a different software component, typically implementing the same data type. Similarly, an update to a software application may refer to an update to one or more components selected for the software application, or a change in the subset of software components selected for the software application, i.e., an addition, removal, or replacement of a software component.

When a software composer is able to select, from a collection of components, the components that the software composer wants to include in the software application, the software composer often needs to assume the role of a software developer and write glue code to let components interact. The glue code refers to the specific components selected by the software composer. With certain (e.g., prescriptive low code) software creation platforms, it is not necessary to write glue code. For example, a software component may refer to data types, data subtypes, and process definitions stored in a catalogue and the development platform can then search for one or more further software components which produces those data types and implements those process definitions, e.g., in the subset of components selected by the software composer of the software application. Optionally, the catalogue may comprise multiple sub catalogues, e.g. one maintained by a composer of the software application and one maintained by the developer of the platform.

With such a software creation platform, when the selected components are integrated, a reference to a data type in a component that consumes data of this data type may be replaced with a reference to the (related) further component that produces data of this data type.

Moreover, with such a software creation platform, it becomes possible to let the software composer of a software component create or update software components referencing a data type, field, or process definition which is not implemented in the software component itself. The software composer of the software component selects this data type, field, or process definition from the catalogue but does not know yet whether the software composer of the software application will select any further software component that implements this data type, field, or process definition and if so, which one. When the software composer of the software application selects a further software component that implements this data type, field, or process definition, the reference to the data type, field, or process definition is replaced with a reference to this further software component.

The embodiment described with reference to FIGS. 5 and/or 7 may be expanded with an intermediate step as shown in FIG. 8. After searching for the further software component in step 503, a check 801 may be performed whether the further software component implementing the data type has been found in the application specification. Preferably, the check comprises determining whether exactly one software component implementing the data type has been found in the application specification. If the further software component is found, the process may continue with performing steps 505-509 and, optionally, steps 511-517, as described above with reference to FIGS. 5 and 7.

If the further software component is not found in the subset, a step 803 may be performed. Step 803 comprises generating an error message. After getting the error message, the composer of the software application could include a further software component which implements the data type in the software application and cause the method to restart at step 503 or, alternatively, at step 501 (not shown in FIG. 8). If the software application comprises more than one software component implementing the data type, the composer could remove one or more software components until only one software component implementing the data type remains in the application specification. In some cases, the composer could remove the software component comprising a reference to a data type that is not implemented by a software component in the application specification.

An optional step 805 comprises generating a list of software components in the collection of software components implementing the data type.

For example, the software composer may first select the components that the software composer wants to include in the software application. The selected components may be specified in the application specification. If the software component comprising a reference to the data type has been selected, a check may take place whether the further software component has been selected which (uniquely) implements the process definition. Typically, this check immediately precedes or is part of the integration process.

It may be desirable to have a software application that minimises or at least reduces resource usage. Therefore, in an embodiment, the method may comprise receiving one or more functionality criteria specifying required functionality of the software application, and creating and/or updating the application specification such that the functionality criteria are met by the software application using a minimal number of software components.

Figure 9:
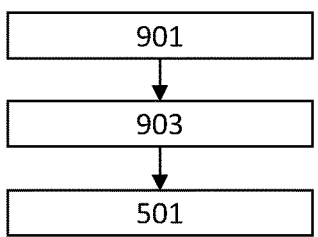
FIG. 9 illustrates creating or updating an application specification according to an embodiment.

FIG. 9 illustrates creating or updating an application specification according to an embodiment of the computer-implemented method of creating and/or updating a software application based on a subset of a collection of software components.

A step 901 comprises receiving one or more functionality criteria specifying required functionality of the software application. The reception may be interactive, e.g. a software composer selecting one or more functionality options presented by the system.

A step 903 comprises creating or updating the application specification such that the functionality criteria are met by the software application using a minimal number of software components and/or a minimal number of data elements.

Step 501 comprises selecting a data type or field referred to by a software component in the subset of software components specified in the created or updated application specification. From step 501, the method may proceed, for example, as described with reference to FIG. 5, 7, 8, or 10A, B.

In some embodiments, step 903 may, alternatively or additionally, take place after step 503. For example, a composer can provide a preliminary application specification which does not necessarily comprise all components that will be used to create the software application. If, in step 503, a further software component implementing the data type or field is not found in the preliminary subset of software components defined by the preliminary application specification, step 903 may be performed to add a minimal set of software components to the preliminary subset of components and update the preliminary application specification based on the added set of software components. Steps 501, 503, and 903 may be repeated until for each data type of field, a software component is found in the subset of software components that implements that data type of field.

Thus, creating and/or updating the application specification may comprise specifying only software components that are needed to meet the functionality criteria. Where applicable, this may comprise removing software components that are no longer needed from the application specification, and/or replacing specified software components by smaller software components that meet the functionality criteria. In general, there may be several different software components, with potentially different data elements, that meet certain functionality criteria. The specification of only a minimum number of components, and/or of components using a minimal number of data elements, thus results in a smaller software application, leading to one or more of: a smaller memory footprint, less processor usage, and hence, a smaller consumption of resources.

The software application may be associated with configuration information 94. The configuration information can comprise a reference to the data type. In an embodiment, at least part of the configuration information in stored in database 95. The configuration information may also be defined in a separate configuration file. The configuration information may define application-specific parameters, such as default values, templates for documents, and so on.

Figure 10A:
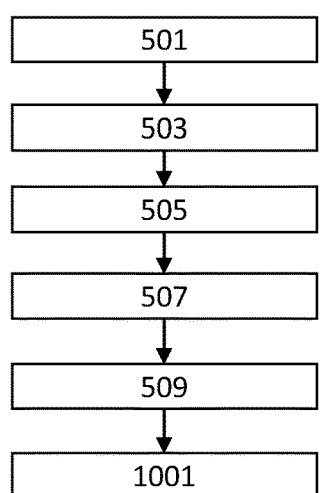
FIGS. 10A and 10B show a further embodiment of the method of creating and/or updating a software application.
Figure 10B:
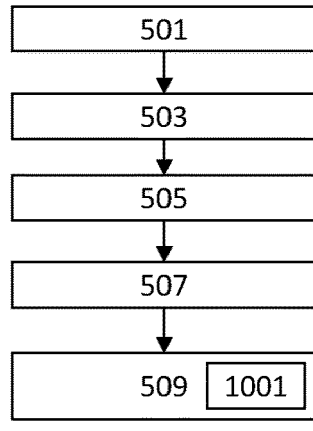

In an embodiment, the method may comprise creating and/or updating the configuration information. As shown in FIGS. 10A and 10B, the method may comprise a step 1001. Step 1001 comprises creating configuration information. FIG. 10A shows step 1001 as an additional step to be performed after step 509. Alternatively, as shown in FIG. 10B, step 1001 can be a part of step 509. In particular, when configuration information is stored in the database, creating configuration information can be part of generating database commands to create the database.

Similarly, updating configuration information can be an additional step in a method of updating a software application as described with reference to e.g. FIGS. 6 and 7. Additionally or alternatively, updating configuration information can be part of a step comprising generating database commands, e.g. part of steps 609 or 517.

The (new) configuration information may be based on the (new) implementation of the data type. A change in configuration information may be based on a change in implementation of the data type. The configuration information may be identifiable by the unique identifier of the data type on which the configuration information is based. The configuration information may be updated based on changes to a software component. For example, a default value that was previously hard-coded may be made application-specific, and may hence need to be added to the configuration information.

In an embodiment, generating the database commands comprises generating database commands based on the configuration information and/or based on the unique identifier.

Figure 11A:
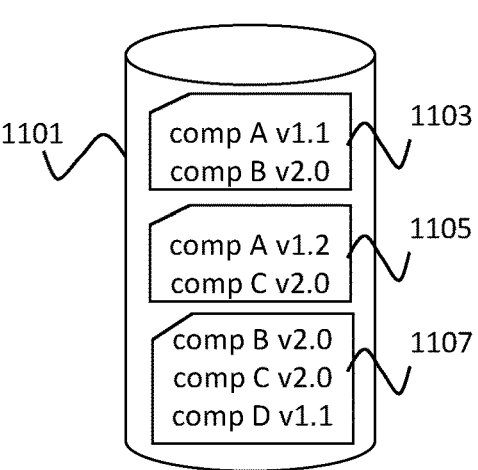
FIGS. 11A and 11B show a further embodiment of the method of updating a software component.
Figure 11B:
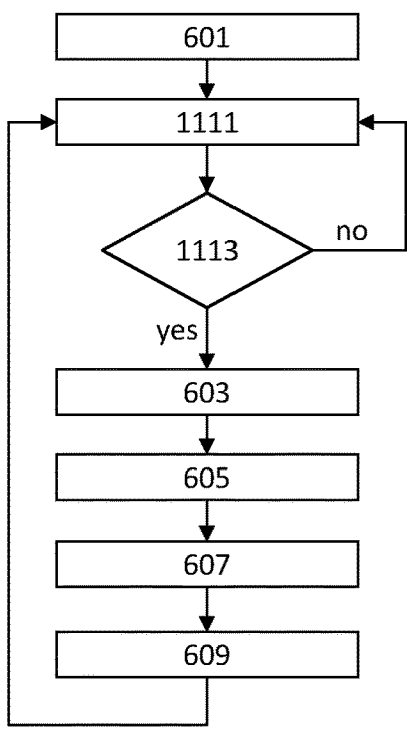

FIGS. 11A and 11B show a further embodiment of the method of updating a software component. A list or database 1101 may be maintained comprising a plurality of application specifications 1103-1107. For example, the computer 1 or the server 61 may store a database of application specifications created on that computer or server, or on a computer or server connected thereto. Each application specification 1103-1107 may comprise information defining the software components in the subset of components selected for that application. Preferably, the application specification defines both the component family and the version number of the selected component.

In the example depicted in FIG. 11A, the database 1101 comprises a first application specification 1103, a second application specification 1105, and a third application specification 1107. The first application specification 1103 defines a software component from component family A associated with version number 1.1, and a software component from component family B associated with version number 2.0. The second application specification 1105 defines a software component from component family A associated with version number 1.2, and a software component from component family C associated with version number 2.0. The third application specification 1107 defines a software component from component family B associated with version number 2.0, a software component from component family B associated with version number 2.0, and a software component from component family B associated with version number 1.1.

The embodiment described with reference to FIG. 6 may be expanded with an additional step as shown in FIG. 11B. A step 1111 comprises selecting an application specification from a plurality of application specifications. Each application specification is associated with a software application. In an embodiment, different versions of an application specification may be associated with different versions of a software application. In some embodiments, if there are multiple versions of an application specification, only one version may be selected based on a predetermined criterion, e.g. the version with the highest version number, or a version that is marked as the 'current' version or 'latest stable release' version.

A step 1113 comprises determining whether the selected application specification comprises an old version of the updated software component. The determination is typically based on the component family and, optionally, the version number. If the application specification does not comprise the software component, or does not comprise a specific version of the software component, a different application specification may be selected. In some cases, the updated component is determined to be defined in an application specification if the version number is equal to, larger than, and or smaller than a predetermined version number.

Steps 601-609 are performed as described with reference to FIG. 6. In some embodiments, step 1113 and step 603 may be combined into a single step. The effect of the additional steps 1111 and 1113 is that all, or at least a plurality of software applications comprising a specific software component can be updated. Thus, an update that is relevant to all or many software applications implementing a certain software component, e.g., a bug fix or an update based on changed legal requirements, can be quickly and easily provided to all relevant customers. A change to a single component can thus be applied to every software application using said component with little effort.

The methods discussed above with respect to FIGS. 5-11 may comprise a further step comprising deploying and/or running the generated software application. Deploying the software application may comprise copying the executable code or the runnable model to a system, typically a server, configured for running the application. Running the software application may comprise executing the executable software code or interpreting the runnable model.

These above-mentioned methods may comprise a further step comprising creating and/or updating the database based on the generated database commands. This step typically comprises executing the generated database commands by (a part of) the system configured for running the generated and/or updated software application. Thus, the database creation and/or database update may be effectuated.

These methods may comprise a further step comprising updating the configuration information based on changes in the implementation of the data element. For example, after deployment and before running the software application, or the first time a software application is run after an update, a script may be triggered on the system running the software application. The configuration information may comprise references to data elements, which may be associated with unique identifiers. Based on these unique identifiers, the script may determine that the referenced data elements have changed and may update the configuration information accordingly. For example, if a data element was renamed from 'Customer' to 'Client', all references to 'Customer' may be replaced by references to 'Client', based on the unchanged identifier associated with the data element.

Figure 12:
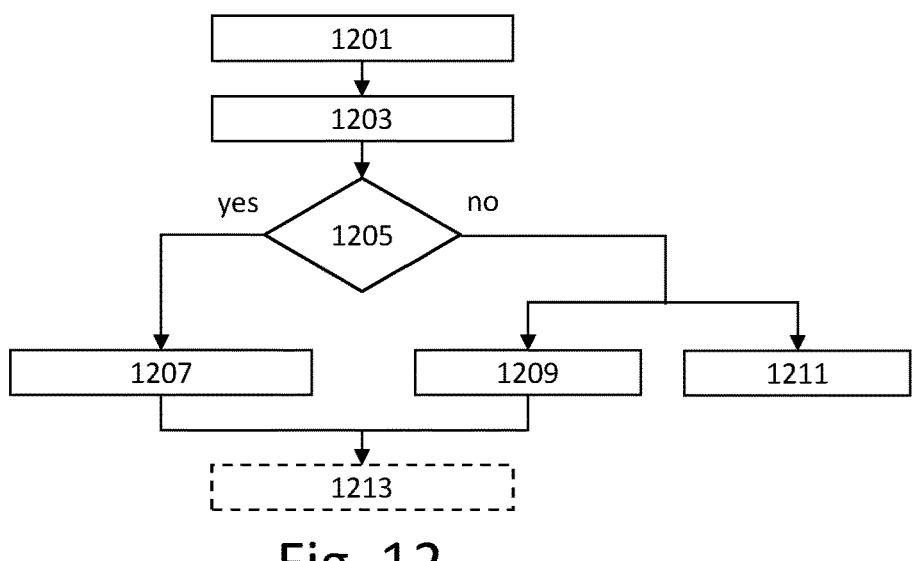
FIG. 12 shows a further embodiment of the method of creating and/or updating a software application.

FIG. 12 shows another embodiment of a method for creating and/or updating a software application based on a subset of a collection of software components, the software application being associated with an application specification specifying the subset of software components. This embodiment can be combined with any of the embodiments discussed above.

A step 1201 comprises determining that the software component comprises a reference to a process definition stored in the catalogue. The process definition may be associated with a further unique identifier. The process definition is not implemented by the software component. The process definition may define a part, e.g. a single step, of a larger process, e.g. a multi-step process.

A step 1203 comprises searching for a further software component which implements the process definition. The searching may be based on the further unique identifier. Step 1203 can be combined with or comprised in, e.g., step 503 in FIG. 5 or step 603 in FIG. 6. A step 1205 comprises determining whether the further software component implementing the process definition has been found in the application specification.

If the further software component has been found, a step 1207 comprises generating software for the software application, respectively for the new version of the software application, from the application specification. The software generation comprises linking the reference to the process definition in the software component to the implementation of the process definition by the further software component, based on the further unique identifier. Step 1207 can be combined with or comprised in step 505 in FIG. 5 or step 605 in FIG. 6. Step 1207 may also comprise further steps, such as generating and compiling software code or generating a runnable model.

If no further software component implementing the process definition is found in the application specification, the method may comprise either a step 1209 or a step 1211. The step 1211 comprises generating an error message. The step 1209 comprises generating software for the software application, respectively for the new version of the software application from the application specification. The generation of the software code may comprise determining a default return value for the implementation of said process definition. This way, software may be consumed based on optional consumption of a process definition. Like step 1207, step 1209 can be combined with or comprised in step 505 in FIG. 5 or step 605 in FIG. 6. Step 1209 may also comprise further steps, such as generating and compiling software code or generating a runnable model.

An optional step 1213 comprises determining that an implementation of a process definition in a software component has been changed. The configuration information may comprise a reference to the process definition, which reference may comprise the further unique identifier. Step 1213 may further comprise updating the configuration information based on the change in the implementation of the process definition and based on the further unique identifier. Updating the configuration information based on a change in the implementation of a process definition can be analogous to updating the configuration information based on a change in the implementation of a data type or attribute, as described above. Step 1213 is typically performed by the server running the software application.

The systems and methods described in this disclosure may also be configured to create or update a user interface element of a user interface associated with the software application. Examples of user interface elements are pages, fields, and buttons. Preferably, the user interface element can be associated with (the implementation of) a data type or field, or with a process. Typically, a field is configured to receive user input associated with a data type or field and/or to provide output associated with at least a data type or field and, optionally, a process. A button is typically configured to initiate a process. However, other options are also possible. Fields and buttons are typically arranged on pages. In some embodiments, a page may correspond to a page in a web application. In other embodiments, a page may correspond to a window or form in a user interface of a non-web-based application. Updating a user interface element may comprise, for example: adding a button or a column to a page or grid that is implemented in another component, or adding a visibility condition or a process to a field or button that is implemented in another component.

In some cases, a change in an implementation of a data element may lead to a change in a user interface element; in other cases, a change in a user interface element may lead to a change in a data element implementation. For example, an input field can be added to a page, implementing an additional attribute of a data type. The added input field, or other user interface element, may be implemented by the same component implementing the data type, or by a different component. For example, a component may add a user interface element on a page generated by a different component. In that case, the user interface element may be added to a virtual page associated with a data element. During the integration of the software model (e.g. as described above with reference to step 103 in FIG. 1), the contents of one or more virtual pages associated with a data element may be added to the actual pages created by the software component implementing the data type.

Instead of, or in addition to, specifying its own fields and/or buttons, a component may use a user interface plug-in to interact with the user. A plug-in is an extension to the functionality of the platform. A plug-in may provide functionality not provided by the platform, thus increasing the use potential. A plug-in is typically developed by a software developer. In principle, plug-ins can be added to any component.

Plug-ins may be specified as user interface plug-ins, action plug-ins, or function plug-ins. Examples of user interface plug-ins are a calendar and a WYSIWYG text editor. An action plug-in can perform steps in a process, for example a call to an external web service. A function plug-in can operate on data, e.g. by performing statistical analysis, determining a difference between two points in time in seconds, or performing other types of calculations. A plug-in can combine multiple types.

A plug-in generally comprises one or more DLLs and an XML file that describes how the platform should deal with the plug-in. The XML file may also describe how a component developer should configure the plug-in. For example, in a calendar plug-in, a developer may need to configure the data type of appointments and configure which fields of the appointments contain start time and end time. For a composer, a plug-in may look like a component. There may be several versions of a plug-in available in the platform, similar to how there can be multiple versions of a software component within a component family.

A plug-in is embedded in a component. The component may be configured to interface between the plug-in and other components. The component may be otherwise empty, i.e., may implement no other functionality than making the plug-in available, but the component may also comprise other parts. A component can comprise multiple plug-ins.

Thus, a step of selecting components, e.g. step 101 in FIG. 1, may comprise loading a plug-in. Several selected components may comprise the same plug-in. A step of integrating software components, e.g. step 103 in FIG. 1, may comprise identifying duplicates of a plug-in, removing the duplicates, and replacing all references to the duplicates of the plug-in by a reference to the single (remaining) instance of the plug-in.

Different components in the selected subset of components may refer to different versions of a plug-in. In that case, the step of integrating software components may comprise generating a warning or an error. The step of integrating software components may also comprise selecting a single version of the plug-in, preferably the most recent version of the plug-in or the version of the plug-in with the highest version identifier, and replacing all references to the different versions of the plug-in by references to the selected version of the plug-in. Preferably, the plug-ins are backwards compatible. If the plug-in is not backwards compatible, an error may be generated.

As was mentioned before, software applications created using embodiments of this disclosure typically use fewer resources than other software applications. These other software applications can generally be divided into two types: package software applications and tailored software applications. Package software applications may also be described as 'general purpose' or 'one size fits all' software applications. Package software applications thus need to provide functionality for a wide array of different users with divergent demands. As a result, package software applications comprise a lot of functionality that many users do not use, leading to a waste of resources. In this context, resources may refer to memory footprint, CPU cycles, database storage space, network usage, energy consumption for running the software application, et cetera.

Table 5 below presents some data regarding resource usage of a small, a medium, and a large software application. The small software application comprises 4 software components and provides only relation management and user management. The medium software applications comprises 43 software components and provides the same functionality as the small software application, and additionally provides sales, invoice and general ledger administration functionality. The large software application comprises 367 software components and provides the same functionality as the medium software application, and additionally provides procurement and logistics administration, time registration, and a content management system. The small software application may be considered a model for a 'bare bones' application, the medium software application a model for an application according to an embodiment, and the large application a model for a package software application.

Even before use, the large software application already uses twice as much memory as the small software application and about 80% more than the medium software application; when in use, the large software application use almost thrice as much as the small software application, and about 70% more than the medium software application. To show the difference in network usage an CPU usage, a command to edit contact data was executed in the three software applications. The amount of data transferred over the network by the large software application is about twice the amount of data transferred by the medium software application, and about 2.5 times the amount of data transferred by the small software application. Similarly, the processing time, which is correlated to CPU usage, used by the large software application is about twice the processing time used by the medium software application and about 2.25 times the processing time used by the small software application. This illustrates the relatively high resource consumption by package software applications, compared to software application according to embodiments of the present disclosure.

TABLE 5

| Data regarding resource usage of a small, a medium, and a large software application. | | | | | |
|---|---|---|---|---|---|
| Application (# components) | Memory initial | Memory after login | Memory after in use | Edit contact data transferred | Edit contact processing time |
| Small (4) | 76.648 kB | 88.160 kB | 95.544 kB | 52.57 kB | 215 ms |
| Medium (43) | 86.184 kB | 128.132 kB | 166.436 kB | 65.97 kB | 239 ms |
| Large (357) | 154.336 kB | 254.884 kB | 279.392 kB | 134.19 kB | 490 ms |

Tailored software applications, on the other hand, are typically designed specifically to meet the demands of a specific customer. Although tailored software applications may initially be more efficient than package software applications, tailored software applications are usually hard to maintain over time. This may lead to either software applications that no longer meets a user's needs, or to a decrease in efficiency of the software application. This is because new functionality is usually implemented adding functionality to the software application, leading to an increase in the software application's size (and hence memory footprint and CPU usage). This is because adding functionality to a tailored software application is usually much simpler, and hence more cost efficient, than replacing and/or removing functionality. For example, creating a new database field with a new name, based on an existing database field, is easier than renaming a database field and ensuring the new name is consistently used in the entire software application.

Over time, this tends to result in a software application whose efficiency degrades, increasing resource consumption.

Figure 13:
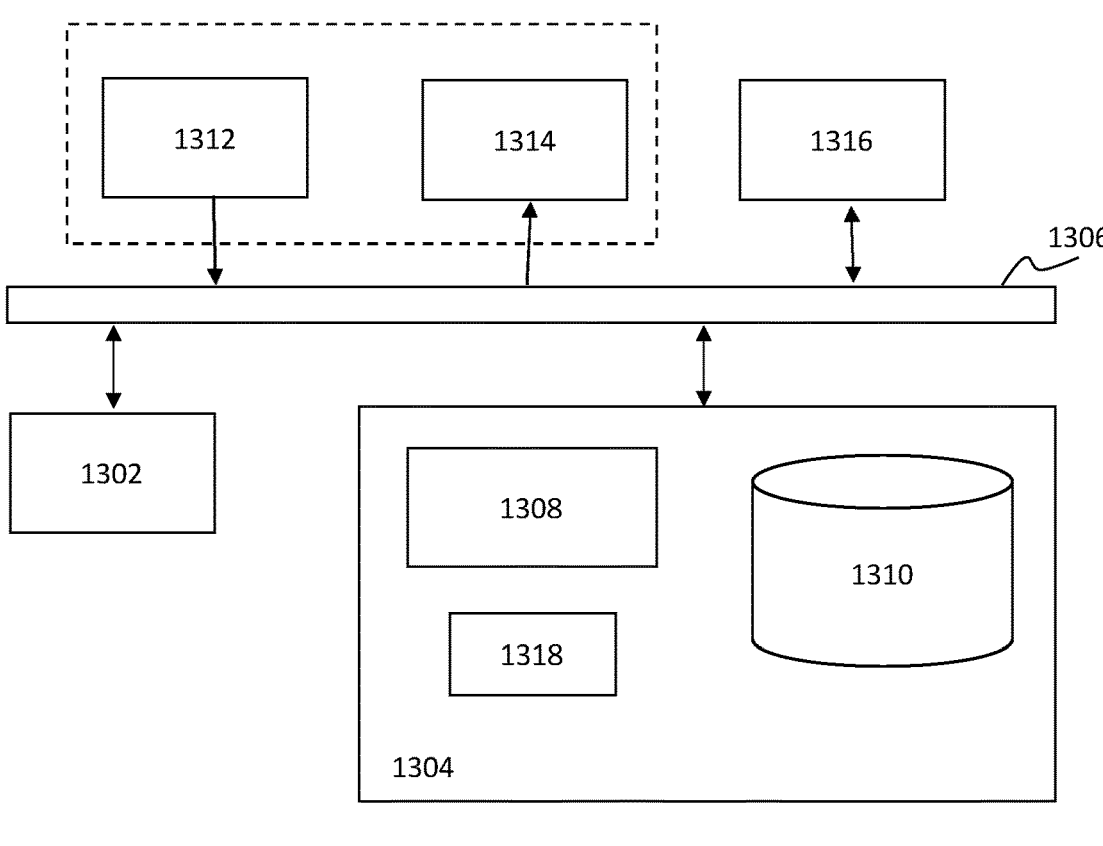
FIG. 13 is a block diagram of an exemplary data processing system for performing the method of the invention.

FIG. 13 depicts a block diagram illustrating an exemplary data processing system that may perform the method as described with reference to FIGS. 1, 5-10, 11B, and 12.

As shown in FIG. 13, the data processing system 1300 may include at least one processor 1302 coupled to memory elements 1304 through a system bus 1306. As such, the data processing system may store program code within memory elements 1304. Further, the processor 1302 may execute the program code accessed from the memory elements 1304 via a system bus 1306. In one aspect, the data processing system may be implemented as a computer that is suitable for storing and/or executing program code. It should be appreciated, however, that the data processing system 1300 may be implemented in the form of any system including a processor and a memory that is capable of performing the functions described within this specification.

The memory elements 1304 may include one or more physical memory devices such as, for example, local memory 1308 and one or more bulk storage devices 1310. The local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from the bulk storage device 1310 during execution.

Input/output (I/O) devices depicted as an input device 1312 and an output device 1314 optionally can be coupled to the data processing system. Examples of input devices may include, but are not limited to, a keyboard, a pointing device such as a mouse, a microphone, or the like. Examples of output devices may include, but are not limited to, a monitor or a display, speakers, or the like. Input and/or output devices may be coupled to the data processing system either directly or through intervening 1/O controllers.

In an embodiment, the input and the output devices may be implemented as a combined input/output device (illustrated in FIG. 13 with a dashed line surrounding the input device 1312 and the output device 1314). An example of such a combined device is a touch-sensitive display, also sometimes referred to as a "touch-screen display" or simply "touch screen". In such an embodiment, input to the device may be provided by a movement of a physical object, such as e.g. a stylus or a finger of a user, on or near the touch screen display.

A network adapter 1316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1300, and a data transmitter for transmitting data from the data processing system 1300 to said systems, devices and/or networks. Modems, cable modems, and Ethernet cards are examples of different types of network adapter that may be used with the data processing system 1300.

As pictured in FIG. 13, the memory elements 1304 may store an application 1318. In various embodiments, the application 1318 may be stored in the local memory 1308, he one or more bulk storage devices 1310, or separate from the local memory and the bulk storage devices. It should be appreciated that the data processing system 1300 may further execute an operating system (not shown in FIG. 13) that can facilitate execution of the application 1318. The application 1318, being implemented in the form of executable program code, can be executed by the data processing system 1300, e.g., by the processor 1302. Responsive to executing the application, the data processing system 1300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for creating a software application for storing and manipulating data in a database, said software application being based on a subset of a collection of software components, said software application being associated with an application specification defining said subset, said system comprising at least one processor configured to:

select a data element referred to by a software component in said subset of software components, said software component comprising a reference referring to said data element, said data element being stored in a catalogue and associated with a unique identifier, said data element not being implemented by said software component;

search, based on the unique identifier, for a further software component in said subset which implements said data element;

determine a database element, said database element being associated with said data element and said database element being identifiable by said unique identifier;

generate software for said software application from said application specification, the generation comprising linking, based on said unique identifier, the reference to said data element in said software component to the implementation of said data element by said further software component; and generate database commands to create the database based on at least said determined database element.

2. The system as claimed in claim 1, wherein said at least one processor is configured to:

determine that a new version of said further software component is available, said new version of said further software component comprising a new implementation of said data element;

generate a new version of said software, the generation comprising linking, based on said unique identifier, the reference to said data element in said software component to the new implementation of said data element by said new version of said further software component;

determine changes to said database element between said implementation of said data element and said new implementation of said data element; and generate database commands to update the database based on at least said changes.

3. The system as claimed in claim 2, wherein a software component in an application specification is associated with a version identifier and wherein determining database commands comprises searching for predetermined data conversion commands based on the version identifier of said further software component in said application specification and the version identifier of said new version of said further software component.

4. The system as claimed in claim 1, wherein said at least one processor is configured to:

receive one or more functionality criteria specifying required functionality of the software application; and create and/or update the application specification such that the functionality criteria are met by the software application using a minimal number of software components and/or a minimal number of data elements.

5. The system as claimed in claim 1, wherein said at least one processor is configured to:

produce an error if said further software component is not found in said subset.

6. The system as claimed in claim 1, wherein the software application is associated with configuration information, said configuration information comprising the reference to said data element, the reference comprising said unique identifier.

7. The system as claimed in claim 2, wherein the software application is associated with configuration information, said configuration information comprising the reference to said data element, the reference comprising said unique identifier; and said at least one processor is configured to:

update the configuration information based on said new implementation of said data element and based on said unique identifier.

8. The system as claimed in claim 6, wherein the generating database commands comprises generating database commands based on said configuration information and based on said unique identifier.

9. The system as claimed in claim 1, wherein said at least one processor is configured to:

search for said further software component in a plurality of application specifications, each application specification being associated with a software application; and select said software application if the application specification associated with said software application comprises said further software component.

10. The system as claimed in claim 1, wherein generating software comprises generating software code and wherein said at least one processor is configured to:

compile said software application based on said software code; and, wherein, generating software comprises generating a runnable model and wherein said at least one processor is configured to:

interpret and execute said runnable model during runtime.

11. The system as claimed in claim 1, wherein said at least one processor is configured to:

create or update the database based on the generated database commands.

12. The system as claimed in claim 1, wherein said at least one processor is configured to:

create or update a user interface element of a user interface associated with said software application, said user interface element being associated with said implementation of said data element, said user interface element being associated with said unique identifier.

13. The system as claimed in claim 1, wherein said at least one processor is configured to:

determine that said software component comprises a reference to a process definition stored in said catalogue, said process definition not being implemented by said software component, said process definition being associated with a further unique identifier;

determine, based on said further unique identifier, whether a further software component in said collection of software components implements said process definition; and, if said further software component implements said process definition, generate software for said software application, the generation comprising linking, based on said further unique identifier, the reference to said process definition in said software component to the implementation of said process definition by said further software component; or if no further software component implements said process definition, perform one of the following actions: generating an error message, or generating software for said software application, the generation comprising determining a default return value for the reference to said process definition.

14. The system as claimed in claim 1, wherein said at least one processor is configured to:

determine that the software components in the subset of software components comprise multiple instances of a plug-in;

select one instance of the plug-in; and replace references to instances that have not been selected with a reference to the selected one instance.

15. The system as claimed in claim 1, wherein generating software comprises generating software code and wherein said at least one processor is configured to:

compile said software application based on said software code.

16. The system as claimed in claim 1, wherein, generating software comprises generating a runnable model and wherein said at least one processor is configured to:

interpret and execute said runnable model during runtime.

17. The system as claimed in claim 2, wherein said at least one processor is configured to:

determine that said software component comprises a reference to a process definition stored in said catalogue, said process definition not being implemented by said software component, said process definition being associated with a further unique identifier;

determine, based on said further unique identifier, whether a further software component in said collection of software components implements said process definition; and, if said further software component implements said process definition, generate software for said new version of said software application, the generation comprising linking, based on said further unique identifier, the reference to said process definition in said software component to the implementation of said process definition by said further software component; or if no further software component implements said process definition, perform one of the following actions: generating an error message, or generating software for said new version of said software application, the generation comprising determining a default return value for the reference to said process definition.

18. The system as claimed in claim 14, wherein said one instance of the plug-in has a highest version number among the multiple instances.

19. A computer-implemented method of creating a software application for storing and manipulating data in a database, said software application being based on a subset of a collection of software components, said software application being associated with an application specification defining said subset, said method comprising:

selecting, by at least one processor, a data element referred to by a software component in said subset of software components, said software component comprising a reference referring to said data element, said data element being stored in a catalogue and associated with a unique identifier, said data element not being implemented by said software component;

searching, by said at least one processor, based on the unique identifier, for a further software component in said subset which implements said data element;

determining, by said at least one processor, a database element, said database element being associated with said data element and said database element being identifiable by said unique identifier;

generating, by said at least one processor, software for said software application from said application specification, the generation comprising linking, based on said unique identifier, the reference to said data element in said software component to the implementation of said data element by said further software component; and generating, by said at least one processor, database commands to create the database based on at least said determined database element.

20. A non-transitory computer-readable medium storing instructions which, when executed on a computer system, cause the computer system to create a software application for storing and manipulating data in a database, said software application being based on a subset of a collection of software components, said software application being associated with an application specification defining said subset, the creation of said software application comprising:

selecting a data element referred to by a software component in said subset of software components, said software component comprising a reference referring to said data element, said data element being stored in a catalogue and associated with a unique identifier, said data element not being implemented by said software component;

searching, based on the unique identifier, for a further software component in said subset which implements said data element;

determining a database element, said database element being associated with said data element and said database element being identifiable by said unique identifier;

generating software for said software application from said application specification, the generation comprising linking, based on said unique identifier, the reference to said data element in said software component to the implementation of said data element by said further software component; and generating database commands to create the database based on at least said determined database element.

* * * * *